US012796706B2

(12) United States Patent
Rindsig et al.

(10) Patent No.: US 12,796,706 B2
(45) Date of Patent: Nov. 17, 2026

(54) METHODS AND SYSTEMS FOR CONCENTRATING A SOLIDS STREAM RECOVERED FROM A PROCESS STREAM IN A BIOREFINERY

(71) Applicant: POET Research, Inc., Sioux Falls, SD (US)

(72) Inventors: Matthew J. Rindsig, Harrisburg, SD (US); Neil D. Anderson, Sioux Falls, SD (US); Rodney Duane Pierson, Wentworth, SD (US); David D. Bushong, Sioux Falls, SD (US); Jacob A. Milbrandt, Tyndall, SD (US); Gregory George Fix, Yankton, SD (US)

(73) Assignee: POET Research, Inc., Sioux Falls, SD (US)

( * ) Notice: Subject to any disclaimer, the term of this patent is extended or adjusted under 35 U.S.C. 154(b) by 271 days.

(21) Appl. No.: 18/216,939

(22) Filed: Jun. 30, 2023

(65) Prior Publication Data

US 2023/0337693 A1 Oct. 26, 2023

Related U.S. Application Data

(63) Continuation of application No. 17/371,356, filed on Jul. 9, 2021, now Pat. No. 11,730,172.

(Continued)

(51) Int. Cl.

*A23C 21/00* (2025.01)
*A23C 1/04* (2006.01)

(Continued)

(52) U.S. Cl.

CPC ................ *A23C 21/00* (2013.01); *A23C 1/04* (2013.01); *A23C 1/12* (2013.01); *B01D 9/0013* (2013.01)

(58) Field of Classification Search

CPC .. A23C 21/00; A23C 1/04; A23C 1/12; B01D 9/0013

(Continued)

(56) References Cited

U.S. PATENT DOCUMENTS 2,446,913 A 8/1948 Erlich
2,478,937 A 8/1949 Neithamer (Continued)

FOREIGN PATENT DOCUMENTS

AU 2833395 A 2/1996
EP 3763222 A1 1/2021

(Continued)

OTHER PUBLICATIONS

A Lecture on Pressure Screening, James A. Olson, Mechanical Engineering Department, University of British Columbia, Aug. 21, 2003.

(Continued)

*Primary Examiner* — Brent T O'Hern
(74) *Attorney, Agent, or Firm* — Mueting Raasch Group

(57) ABSTRACT

The present disclosure relates to methods and systems for concentrating a solids stream recovered from one or more process streams derived from a beer in a biorefinery by exposing the recovered solids stream to an evaporator system to remove moisture therefrom and form a concentrated, recovered solids stream.

22 Claims, 8 Drawing Sheets

Related U.S. Application Data

(60) Provisional application No. 63/052,250, filed on Jul. 15, 2020.

(51) Int. Cl.
*A23C 1/12* (2006.01)
*B01D 9/00* (2006.01)

(58) Field of Classification Search
USPC .......................................................... 426/271
See application file for complete search history.

(56) References Cited

U.S. PATENT DOCUMENTS

| | | | |
|---|---|---|---|
| 2,698,826 | A | 1/1955 | Peltzer |
| 3,538,551 | A | 11/1970 | Joa |
| 3,761,027 | A | 9/1973 | Mendoza |
| 4,056,636 | A | 11/1977 | Muller |
| 4,361,651 | A | 11/1982 | Keim |
| 4,565,330 | A | 1/1986 | Katoh |
| 5,195,684 | A | 3/1993 | Radzins |
| 5,250,182 | A | 10/1993 | Bento et al. |
| 5,662,810 | A | 9/1997 | Willgohs |
| 5,795,477 | A | 8/1998 | Herman et al. |
| 6,106,673 | A | 8/2000 | Walker |
| 6,117,321 | A | 9/2000 | Johnston |
| 6,230,995 | B1 | 5/2001 | Niemi et al. |
| 6,475,132 | B2 | 11/2002 | Zettier |
| 6,509,180 | B1 | 1/2003 | Verser et al. |
| 6,648,500 | B2 | 11/2003 | Fedorov et al. |
| 6,962,722 | B2 | 11/2005 | Dawley et al. |
| 7,083,954 | B2 | 8/2006 | Jakel et al. |
| 7,101,691 | B2 | 9/2006 | Kinley et al. |
| 7,300,680 | B2 | 11/2007 | Prevost et al. |
| 7,384,010 | B2 | 6/2008 | Horigane et al. |
| 7,497,955 | B2 | 3/2009 | Scheimann et al. |
| 7,507,562 | B2 | 3/2009 | Verser et al. |
| 7,572,353 | B1 | 8/2009 | Vander Griend |
| 7,601,858 | B2 | 10/2009 | Cantrell et al. |
| 7,608,729 | B2 | 10/2009 | Winsness et al. |
| 7,699,255 | B2 | 4/2010 | Kapper |
| 7,829,680 | B1 | 11/2010 | Sander et al. |
| 7,842,484 | B2 | 11/2010 | Lewis |
| 7,857,608 | B2 | 12/2010 | Fabbricante et al. |
| 7,858,140 | B2 | 12/2010 | Paustian et al. |
| 7,886,996 | B2 | 2/2011 | Horigane et al. |
| 7,888,082 | B2 | 2/2011 | Verser et al. |
| 7,915,458 | B2 | 3/2011 | Bruckmayer |
| 7,919,289 | B2 | 4/2011 | Lewis |
| 7,919,291 | B2 | 4/2011 | Lewis et al. |
| 7,935,370 | B1 | 5/2011 | Prevost et al. |
| 7,954,734 | B2 | 6/2011 | Hata |
| 8,017,365 | B1 | 9/2011 | Rein et al. |
| 8,093,023 | B1 | 1/2012 | Prevost et al. |
| 8,103,385 | B2 | 1/2012 | Macharia et al. |
| 8,126,606 | B2 | 2/2012 | Hung |
| 8,168,037 | B2 | 5/2012 | Winsness |
| 8,192,627 | B2 | 6/2012 | Gallop et al. |
| 8,236,086 | B2 | 8/2012 | Janssen et al. |
| 8,236,977 | B2 | 8/2012 | Woods et al. |
| 8,257,951 | B2 | 9/2012 | Prevost et al. |
| 8,449,728 | B2 | 5/2013 | Redford |
| 8,454,802 | B2 | 6/2013 | Redford |
| 8,524,473 | B2 | 9/2013 | Hammond et al. |
| 8,563,282 | B2 | 10/2013 | Galvez et al. |
| 8,597,917 | B2 | 12/2013 | Medoff et al. |
| 8,603,786 | B2 | 12/2013 | Redford |
| 8,679,353 | B2 | 3/2014 | Winsness |
| 8,702,819 | B2 | 4/2014 | Bootsma |
| 8,722,372 | B2 | 5/2014 | Kiuchi et al. |
| 8,722,911 | B2 | 5/2014 | Bleyer et al. |
| 8,735,544 | B1 | 5/2014 | Prevost et al. |
| 8,748,141 | B2 | 6/2014 | Lewis et al. |
| 8,778,433 | B2 | 7/2014 | Lee |
| 8,813,973 | B2 | 8/2014 | Lee et al. |
| 8,927,239 | B2 | 1/2015 | Allen et al. |
| 8,956,460 | B2 | 2/2015 | Ahmed et al. |
| 8,962,059 | B1 | 2/2015 | Froderman et al. |
| 8,986,551 | B2 | 3/2015 | Kohl et al. |
| 9,012,191 | B2 | 4/2015 | Lee |
| 9,012,668 | B2 | 4/2015 | Winsness |
| 9,029,126 | B2 | 5/2015 | Bleyer et al. |
| 9,040,270 | B2 | 5/2015 | Prevost et al. |
| 9,051,538 | B1 | 6/2015 | Roa-Espinosa |
| 9,061,987 | B2 | 6/2015 | Bootsma |
| 9,108,140 | B2 | 8/2015 | Winsness |
| 9,114,114 | B2 | 8/2015 | Anderson et al. |
| 9,139,803 | B2 | 9/2015 | Redford |
| 9,150,790 | B2 | 10/2015 | Thorn et al. |
| 9,169,498 | B2 | 10/2015 | Woods et al. |
| 9,212,334 | B2 | 12/2015 | Cantrell et al. |
| 9,290,728 | B2 | 3/2016 | Bootsma |
| 9,320,990 | B2 | 4/2016 | Winsness |
| 9,328,311 | B2 | 5/2016 | Jenkins et al. |
| 9,340,767 | B2 | 5/2016 | Narendranath |
| 9,353,332 | B2 | 5/2016 | Lewis et al. |
| 9,375,731 | B2 | 6/2016 | Dieker et al. |
| 9,376,504 | B2 | 6/2016 | Dieker et al. |
| 9,388,475 | B2 | 7/2016 | Lee |
| 9,394,505 | B2 | 7/2016 | Sticklen et al. |
| 9,516,891 | B1 | 12/2016 | Roa-Espinosa |
| 9,631,161 | B2 | 4/2017 | Sungail et al. |
| 9,695,381 | B2 | 7/2017 | Lee |
| 9,695,449 | B2 | 7/2017 | Bootsma |
| 9,714,267 | B2 | 7/2017 | Emanuele et al. |
| 9,718,006 | B2 | 8/2017 | Lee et al. |
| 9,730,463 | B1 | 8/2017 | Roa-Espinosa |
| 9,745,540 | B2 | 8/2017 | Sungail et al. |
| 9,896,643 | B2 | 2/2018 | Redford |
| 9,914,898 | B2 | 3/2018 | Hakmiller |
| 9,914,899 | B2 | 3/2018 | Bingeman et al. |
| 9,963,671 | B2 | 5/2018 | Williams et al. |
| 10,021,897 | B2 | 7/2018 | Redford |
| 10,059,966 | B2 | 8/2018 | Bootsma |
| 10,093,891 | B2 | 10/2018 | Kohl et al. |
| 10,113,007 | B2 | 10/2018 | Kohl |
| 10,160,932 | B2 | 12/2018 | Lee |
| 10,214,559 | B2 | 2/2019 | Modinger et al. |
| RE47,268 | E | 3/2019 | Roa-Espinosa |
| 10,226,774 | B2 | 3/2019 | Franko |
| 10,260,031 | B2 | 4/2019 | Gallop et al. |
| 10,400,201 | B2 | 9/2019 | Yu |
| 10,449,469 | B2 | 10/2019 | Lewis |
| 10,465,152 | B2 | 11/2019 | Bootsma |
| 10,584,304 | B2 | 3/2020 | Schnell et al. |
| 10,683,479 | B2 | 6/2020 | Lucas |
| 10,745,643 | B2 | 8/2020 | Gallop et al. |
| 10,774,303 | B2 | 9/2020 | Dieker et al. |
| 10,781,398 | B2 | 9/2020 | Kreel et al. |
| 10,837,029 | B2 | 11/2020 | Bootsma |
| 10,851,327 | B2 | 12/2020 | Urban et al. |
| 10,875,889 | B2 | 12/2020 | Jakel |
| 10,926,267 | B2 | 2/2021 | Hora et al. |
| 11,015,156 | B1 | 5/2021 | Kohl et al. |
| 11,028,378 | B2 | 6/2021 | Jump et al. |
| 11,078,500 | B2 | 8/2021 | Hansen et al. |
| 11,104,873 | B2 | 8/2021 | Bootsma |
| 11,166,478 | B2 | 11/2021 | Lee |
| 11,248,197 | B2 | 2/2022 | Bootsma |
| 11,254,955 | B2 | 2/2022 | Bootsma |
| 11,266,166 | B2 | 3/2022 | Gallop et al. |
| 11,273,455 | B2 | 3/2022 | Xu |
| 11,286,509 | B2 | 3/2022 | Bootsma |
| 11,337,442 | B2 | 5/2022 | Lecocq et al. |
| 11,345,875 | B2 | 5/2022 | Schnell et al. |
| 11,485,990 | B2 | 11/2022 | Pohl et al. |
| 11,713,474 | B2 | 8/2023 | Bootsma |
| 11,718,863 | B2 | 8/2023 | Bootsma |
| 11,730,172 | B2 * | 8/2023 | Rindsig .................... F26B 3/04 426/271 |
| 11,739,352 | B1 | 8/2023 | Carlson et al. |
| 2004/0087808 | A1 | 5/2004 | Prevost et al. |
| 2004/0192896 | A1 | 9/2004 | Finch |
| 2004/0234649 | A1 | 11/2004 | Lewis et al. |

(56) References Cited

U.S. PATENT DOCUMENTS

| | | | |
|---|---|---|---|
| 2005/0233030 | A1 | 10/2005 | Lewis et al. |
| 2005/0239181 | A1 | 10/2005 | Lewis et al. |
| 2006/0194296 | A1 | 8/2006 | Hammond et al. |
| 2007/0031953 | A1 | 2/2007 | Dunson, Jr. et al. |
| 2007/0036881 | A1 | 2/2007 | Griffith |
| 2007/0141691 | A1 | 6/2007 | Hirl |
| 2007/0148318 | A1 | 6/2007 | Rubio et al. |
| 2007/0190626 | A1 | 8/2007 | Wilkening et al. |
| 2007/0238691 | A1 | 10/2007 | Thompson et al. |
| 2007/0254089 | A1 | 11/2007 | Hickey et al. |
| 2008/0009048 | A1 | 1/2008 | Bhargava et al. |
| 2008/0110577 | A1 | 5/2008 | Winsness |
| 2008/0193991 | A1 | 8/2008 | Allen et al. |
| 2008/0277264 | A1 | 11/2008 | Sprague |
| 2009/0093027 | A1 | 4/2009 | Balan et al. |
| 2009/0176289 | A1 | 7/2009 | Friedmann |
| 2009/0250412 | A1 | 10/2009 | Winsness et al. |
| 2009/0269817 | A1 | 10/2009 | Lantero |
| 2009/0311397 | A1 | 12/2009 | Whalen et al. |
| 2010/0055741 | A1 | 3/2010 | Galvez et al. |
| 2010/0159071 | A1 | 6/2010 | Redford |
| 2010/0159519 | A1 | 6/2010 | Diner et al. |
| 2010/0159549 | A1 | 6/2010 | Redford |
| 2010/0159551 | A1 | 6/2010 | Redford |
| 2010/0199062 | A1 | 8/2010 | Sancho-Dominguez et al. |
| 2010/0221804 | A1 | 9/2010 | Veit et al. |
| 2010/0281765 | A1 | 11/2010 | Schwartz |
| 2011/0003341 | A1 | 1/2011 | Nojiri et al. |
| 2011/0086149 | A1 | 4/2011 | Bootsma |
| 2011/0142788 | A1 | 6/2011 | Sellier et al. |
| 2011/0143411 | A1 | 6/2011 | Yuan et al. |
| 2012/0051980 | A1 | 3/2012 | Gallop et al. |
| 2012/0064213 | A1 | 3/2012 | Lee |
| 2012/0244590 | A1 | 9/2012 | Lee |
| 2013/0121891 | A1 | 5/2013 | Dieker et al. |
| 2013/0164795 | A1 | 6/2013 | Lowe et al. |
| 2013/0165678 | A1 | 6/2013 | Kohl et al. |
| 2013/0295661 | A1 | 11/2013 | Roesch et al. |
| 2014/0017728 | A1 | 1/2014 | Bleyer et al. |
| 2014/0024084 | A1 | 1/2014 | Galvez, III et al. |
| 2014/0110512 | A1 | 4/2014 | Lee |
| 2014/0155639 | A1 | 6/2014 | Sticklen et al. |
| 2014/0171670 | A1* | 6/2014 | Jenkins .................... C11B 1/10 252/60 |
| 2014/0178946 | A1 | 6/2014 | Galvez, III et al. |
| 2014/0273127 | A1 | 9/2014 | Fruchs et al. |
| 2014/0273166 | A1 | 9/2014 | Narendranath |
| 2014/0315259 | A1 | 10/2014 | Woods |
| 2015/0024451 | A1 | 1/2015 | Williams |
| 2015/0037857 | A1 | 2/2015 | Redford |
| 2015/0056327 | A1 | 2/2015 | Redford |
| 2015/0076078 | A1 | 3/2015 | Gallop |
| 2015/0118727 | A1 | 4/2015 | Escudero et al. |
| 2015/0147786 | A1 | 5/2015 | Clarkson et al. |
| 2015/0152196 | A1 | 6/2015 | Phanopoulos et al. |
| 2015/0152372 | A1 | 6/2015 | Kohl et al. |
| 2015/0181911 | A1 | 7/2015 | Redford |
| 2015/0181912 | A1 | 7/2015 | Redford |
| 2015/0182882 | A1 | 7/2015 | Gallop et al. |
| 2015/0191675 | A1* | 7/2015 | Cantrell ................. C11B 3/001 435/165 |
| 2015/0191750 | A1 | 7/2015 | Bleyer et al. |
| 2015/0201647 | A1 | 7/2015 | Fosdick et al. |
| 2015/0299645 | A1 | 10/2015 | Williams |
| 2016/0024406 | A1 | 1/2016 | Javers et al. |
| 2016/0145650 | A1 | 5/2016 | Lewis et al. |
| 2016/0152931 | A1 | 6/2016 | Bootsma |
| 2016/0222135 | A1 | 8/2016 | Lee |
| 2017/0051322 | A1 | 2/2017 | Bushong et al. |
| 2017/0107452 | A1 | 4/2017 | Dasari et al. |
| 2017/0114293 | A1 | 4/2017 | Jakel et al. |
| 2017/0166834 | A1 | 6/2017 | Jakel |
| 2017/0166835 | A1 | 6/2017 | Jakel |
| 2017/0226165 | A1 | 8/2017 | Franko et al. |
| 2017/0253892 | A1 | 9/2017 | Bootsma |
| 2017/0268024 | A1 | 9/2017 | Bootsma et al. |
| 2018/0016602 | A1 | 1/2018 | Franko et al. |
| 2018/0126302 | A1 | 5/2018 | Gallop |
| 2018/0199591 | A1 | 7/2018 | Kindelspire et al. |
| 2018/0242626 | A1 | 8/2018 | Froderman et al. |
| 2018/0355387 | A1 | 12/2018 | Javers et al. |
| 2019/0048286 | A1 | 2/2019 | Schnell et al. |
| 2019/0119711 | A1 | 4/2019 | Lee |
| 2019/0160470 | A1* | 5/2019 | Hora ....................... C13K 1/02 |
| 2019/0374883 | A1 | 12/2019 | Gallop et al. |
| 2020/0113209 | A1 | 4/2020 | Gallop et al. |
| 2020/0128855 | A1 | 4/2020 | Gallop et al. |
| 2020/0139269 | A1 | 5/2020 | Gallop et al. |
| 2020/0165540 | A1 | 5/2020 | Schnell et al. |
| 2020/0199062 | A1 | 6/2020 | Franko et al. |
| 2020/0359657 | A1 | 11/2020 | Gallop et al. |
| 2021/0002584 | A1 | 1/2021 | Urban et al. |
| 2021/0002686 | A1 | 1/2021 | Pohl et al. |
| 2021/0062122 | A1 | 3/2021 | Franko et al. |
| 2021/0130857 | A1 | 5/2021 | Akerman et al. |
| 2021/0251256 | A1 | 8/2021 | Gibbons et al. |
| 2022/0002660 | A1 | 1/2022 | Sonnek et al. |
| 2022/0002762 | A1 | 1/2022 | Botella-Franco et al. |
| 2022/0132885 | A1 | 5/2022 | Harstad |
| 2022/0142200 | A1 | 5/2022 | Gibbons et al. |
| 2022/0151260 | A1 | 5/2022 | Janow et al. |
| 2022/0186266 | A1 | 6/2022 | Kreel |
| 2022/0240544 | A1 | 8/2022 | Levine |
| 2022/0282180 | A1 | 9/2022 | Schnell et al. |
| 2022/0287332 | A1 | 9/2022 | Jakel et al. |
| 2022/0298532 | A1 | 9/2022 | Pal et al. |
| 2022/0361525 | A1 | 11/2022 | Jakel et al. |

FOREIGN PATENT DOCUMENTS

| | | | |
|---|---|---|---|
| EP | 3 831 915 | A1 | 6/2021 |
| WO | WO 2005/029974 | A1 | 4/2005 |
| WO | 2014018479 | A1 | 1/2014 |
| WO | 2015168020 | A2 | 11/2015 |
| WO | WO 2017/059083 | A1 | 4/2017 |
| WO | WO 2017/091760 | A1 | 6/2017 |
| WO | WO 2017/091766 | A1 | 6/2017 |
| WO | WO 2018/215965 | A1 | 11/2018 |
| WO | WO 2018/217202 | A1 | 11/2018 |
| WO | WO 2018/231371 | A1 | 12/2018 |
| WO | WO 2019/226703 | A1 | 11/2019 |
| WO | WO 2019/226704 | A1 | 11/2019 |
| WO | WO 2019/226707 | A1 | 11/2019 |
| WO | WO 2020/109268 | A1 | 6/2020 |
| WO | WO 2020/178184 | A1 | 9/2020 |
| WO | WO 2020/206058 | A1 | 10/2020 |
| WO | WO 2020/261291 | A1 | 12/2020 |
| WO | WO 2021/026201 | A1 | 2/2021 |
| WO | WO 2021/237083 | A1 | 11/2021 |
| WO | WO 2021/237363 | A1 | 12/2021 |
| WO | WO 2022/087158 | A1 | 4/2022 |
| WO | WO 2022/165128 | A1 | 8/2022 |

OTHER PUBLICATIONS

Abdel-Tawwab et al., "Evaluation of commercial live bakers' yeast, *Saccharomyces cerevisiae* as a growth and immunity promoter for Fry Nile tilapia, *Oreochromis niloticus* (L.) challenged in situ with Aeromonas hydrophila", Aquaculture, vol. 280, Issues 1-4, pp. 185-189, 2008, (5 pages).

About Harvesting Technology: Bringing Profitable Innovation for Ethanol Production, retrieved on Jun. 26, 2018 via http:/harvestingtech.com/#benefils, (11 pages).

Akinoso, R., et al. "Work Index and Milling Efficiency of Size Reduction of Maize Using Plate Mill", Agricultural Engineering today, vol. 36, pp. 22-28, 2012. {ABSTRACT).

Ankom, "Acid Detergent Fiber in Feeds—Filter Bag Technique (for A2000 and A20001)", ADF method, pp. 1-2, 2017.

AOAC International "AOAC 965.22-1966", pp. 1, 1996.

Benedetti, A., et al., "X-ray diffraction methods to determine crystallinity and preferred orientation of lithium disilicate n Li—Zn-

(56) References Cited

OTHER PUBLICATIONS silicate glass-ceramic fibres", Journal of Materials Science, vol. 18, pp. 1039-1048, 1983 (Abstract).
Chatzifragkou et al., "Biorefinery strategies for upgrading distillers' dried grains with solubles (DOGS)", Process Biochemistry, vol. 50, 2015, pp. 2194-2207.
Cheetham, et al., Variation in crystalline type with amylase content in maize starch granules: an X-ray powder diffraction study, Carbohydrate Polymers, vol. 36, pp. 277-284, 1998.
Disc Mill DM 400-Retsch, Powerful grinding and robust design, Aug. 19, 2015.
Ethanol Producers Talk Shop, pp. 1-3, Ron Kotrba, Aug. 1, 2006.
Flash Dryer, retrieved from https://www.gea.com/en/products/dryers-particle-processing/flash-dryers-coolers/flash-dryer.jsp, on Jun. 9, 2020, (11 pages).
"Flottweg Separation Technology," Web page <https://www.flottweg.com/fileadmin/user_upload/data/pdf-downloads/Sedicanter-EN.pdf>, 12 pages, Aug. 10, 2016, retrieved from Internet Archive Wayback Machine<https://web.archive.org/web/20160810032610/https://www.flottweg.com/fileadmin/user_upload/data/pdf-downloads/Sedicanter-EN.pdf> on Jul. 12, 2022.
Fluid Quip-Ethanol Industry, Corn Wet Milling Process Description, website pp. 1-6, Aug. 19, 2015.
Hames, B., et al., "Determination of Protein Content in Biomass", National Renewable Energy Laboratory, pp. 1-8, 2008.
Hunt, et al. "Corn Stillage as a Feedstuff for Broilers and Turkeys", Applied Poultry Science, Inc., Research Report 1997, published online at http://japr.fass.org/contenl/6/3/310.full.pdf, (9 pages).
International Standard, IS013320, Particle size analysis-Laser diffraction methods, pp. 1-58. 2009.
Jakel, "Product Diversification: Proven Path Forward", presented at the ACE conference which was held Aug. 15-17, 2017 in Omaha NE, (71 pages).
Kim et al., "Composition of corn dry-grind ethanol by-products: DDGS, wet cake, and thin stillage", Science Direct, Bioresource Technology, vol. 99, pp. 5165-5176, 2008, (12 pages).
Kim et al., "Process simulation of modified dry grind ethanol plant with recycle of pretreated and enzymatically hydrolyzed distillers' grains", Bioresource Technology, vol. 99, 2008, pp. 5177-5192.
Li, "Enzymes for Cellular Lysis or Protoplast Formation: Bacteria, Yeasts, and Plant", published at https://cellculturedish.com/experts/shanghao-li/, A guest post by Shanghao Li, Ph.D. is Global Product Manager of Immunology and Cell Biology at MP Biomedicals LLC, 2019, (12 pages).
Nara, S., et al., "Studies on the Relationship Between Water-satured State and Crystallinity by the Diffraction Method or Moistened Potato Starch", starch, vol. 35, Issue 12, pp. 407-410, 1983. (Abstract).
Nouroddini et al., "Stagewise Dilute-Acid Pretreatment and Enzyme Hydrolysis of Distillers' Grains and Com Fiber", Appl Biochem Biotech, 159, pp. 553-567, 2009.
Particle Size Distributions of Ground Com and DDGS from Dry Grind Processing, Rausch et al., Transactions of the ASAE, vol. 48(1), pp. 273-277, 2005.
Pleasant Hill Grain, website catalog pp. 1-8, ABC Hansen Disc Mill, Aug. 9, 2015.
Rausch et al., "The Future of Coproducts From Corn Processing", Applied Biochemistry and Biotechnology, vol. 128, pp. 47-86, 2006, (40 pages).
Ring Dryer, retrieved from https://www.gea.com/en/products/dryers-particle-processing/ring-dryers/ring-dryer.jsp, on Jun. 9, 2020, (12 pages).
Robert, "Industrial Glucose: Bridging the Biochemical GAP", presented at the Renewable Chemicals Summit which was held Apr. 3-5, 2019 in Washington, DC, (20 pages).
Rosentrater, "Production and use of evolving corn-based fuel ethanol coproducts in the U.S" In: Biernat Editor): 11 Biofuels—Status and perspective, 2015, pp. 81-98.
Sluiter, A., et al., "Determination of Ash in Biomass", National Renewable Energy Laboratory, pp. 1-8, 2005.
Sluiter, A., et al., "Determination of Extractives in Biomass", National Renewable Energy Laboratory, pp. 1-12, 2005.
Sluiter, A., et al., "Determination of starch in solid biomass samples", National Renewable Energy Laboratory, pp. 1-7, 2005. (Abstract).
Sluiter, A., et al., "Determination of Structural Carbohydrates and Lignin in Biomass", National Renewable Energy Laboratory, pp. 1-18, 2012.
Sluiter, A., et al., "Determination of Total Solids in Biomass and Total Dissolved Solids in Liquid Process Samples", National Renewable Energy Laboratory, pp. 1-9, 2008.
Svonja, "From Operating Ease to Operating Costs: Weighing Differences in DDGS Dryers", retrieved from http://ethanolproducer.com/articles/3032/from-operating-ease-to-operating-costs-weighing-differences-in-ddgs-dryers, May 22, 2007, (3 pages).
Thin Stillage Solids Separation System, retrieved on Jun. 26, 2018 via http://www.icminc.com/products/thin-stillagesolds separation-system.html, (2 pages).
Wongsagonsup et al., "Effects of different mill types on ethanol production using uncooked dry-grind fermentation and characteristics of residual starch in distiller's dried grains (DOG)", Cereal Chemistry, vol. 94, Feb. 27, 2017, pp. 645-653. (Abstract).
Yamada et al., "Yeast (*Saccharomyces cerevisiae*) Protein Concentrate: Preparation, Chemical Composition, and Nutritional and Functional Properties", Journal of Agricultural and Food Chemistry, vol. 53, No. 10, pp. 3931-3936, 2005, (6 pages).
Savoire, et al. (2013) "Mechanical Continuous Oil Expression from Oilseeds: A Review", Food Bioprocess Technology 6:1-16 (16 pages).
Valicor, White Paper, (2015) "Back-End Value Enhanced through Patented Technology and Strategic Partnerships", Vital For Tommorow, www.valicor.com, Info@valicor.com, pp. 1-5, (5 pages).
Wang, H. et al., (2008) "Effect of the Corn Breaking Method on Oil Distribution between Stillage Phases of Dry-Grind Corn Ethanol Production", Iowa State University, Digital Repository @ lowa State University, Food Science and Human Nutrition Publication and Papers, J. Agric. Food Chem, 56(21), pp. 9975-9980 (7 pages).
Dickey, L. C., et al., (2009) "Foam Separation of Oil from Enzymatically Treated Wet-Milled Corn Germ Dispersions", J. Am Oil Chem Soc, 86, pp. 927-932, (6 pages).
Majoni, S. et al., (2011) "Physical and Chemical Processes to Enhance Oil Recovery from Condensed Corn Distillers Solubles", J. Am Oil Chem Soc, 88, pp. 425-434, (10 pages).
Wang, T., "Maximizing Oil Recovery from Corn Fermentation By-products", Power Point Slides, Food Science and Human Nutrition, Iowa State University, Aug. 24, 2018 pp. 1-20, (20 pages).
Majoni, S. et al., (2011) "Enzyme Treatments to Enhance Oil Recovery from Condensed Corn Distillers Solubles", J. Am Oil Chem Soc, 88, pp. 523-532, (10 pages).
Wang, H. et al., (2009) "Effect of Low-Shear Extrusion on Corn Fermentation and Oil Partition", Iowa State University, Digital Repository, Food Science and Human Nutrition Publication, J. Agric. Food Chem, 57(6), pp. 2302-2307 (8 pages).
Fang, L. et al. (2015) "Synergistic effect of surfactants and silica nanoparticles on oil recovery from condensed corn distillers solubles (CCDS)", Industrial Crops and Products, 77, 553-559, (7 pages).
Fang, L. et al. (2018) "Use of surfactant and enzymes in dry-grind corn ethanol fermentation improves yield of ethanol and distillers corn oil", Industrial Crops & Products, 111, 329-335, (7 pages).
Manjoni, S. et al. (2010) "Characterization of Oil Precipitate and Oil Extracted from Condensed Corn Distillers Solubles", J Am Oil Chem Soc, 87, 205-213, (9 pages).
Sekhon, J.K. et al. (2018) "Effect of co-products of enzyme-assisted aqueous extraction of soybeans, enzymes, and surfactant on oil recovery from integrated corn-soy fermentation", Industrial Crops & Products, 121, 441-451, (11 pages).
Wang, H. et al. (2010) "Effects of Kernel Breakage and Fermentation on Corn Germ Integrity and Oil Quality", Journal of Agricultural and Food Chemistry, 58, 10039-10044 (7 pages).
Wang, H. et al. (2009) "A Laboratory Decanting Procedure to Simulate Whole Stillage Separation in Dry-Grind Corn Ethanol Process", Journal Am. Oil Chem. Soc, (10 pages).

* cited by examiner

METHODS AND SYSTEMS FOR CONCENTRATING A SOLIDS STREAM RECOVERED FROM A PROCESS STREAM IN A BIOREFINERY

RELATED APPLICATIONS

This application is a continuation of U.S. patent application Ser. No. 17/371,356 filed Jul. 9, 2021, issued as U.S. Pat. No. 11,730,172 on Aug. 22, 2023, which claims the benefit of U.S. Provisional Patent Application No. 63/052,250, filed on Jul. 15, 2020, wherein the entirety of each of said patent documents is incorporated herein by reference.

BACKGROUND

Biorefineries can produce one or more biochemicals from micoorganisms such as yeast, bacteria, and the like. For example, a biorefinery can produce fuel-grade ethanol using a fermentation-based process. Much of the ethanol used for transportation fuel in the United States is produced from the fermentation of corn. In an exemplary dry-grind ethanol production process, a vegetable such as corn is delivered to a biorefinery, and its particle size can be reduced by grinding the corn in a dry milling step. The resulting corn flour can then be combined with water, nutrients, enzymes, yeast, and/or other ingredients in a fermenter. Enzymes convert starch into fermentable sugars and microorganism such as yeast can convert fermentable sugars into ethanol. Fermentation results in a beer stream that includes, e.g., ethanol, water, suspended solids, dissolved solids, and corn oil. The beer stream is processed by a distillation unit where ethanol is removed.

The stream from the distillation unit after ethanol has been recovered is referred to as whole stillage. This whole stillage stream includes, e.g., suspended solids, dissolved solids, water, and corn oil, which can be recovered as one or more co-products. The whole stillage stream is separated, typically by decanting centrifuges, into a thin stillage stream and a wet cake stream. The wet cake stream has a higher concentration of solids than whole stillage and is typically of a relatively high viscosity sludge-like consistency. The thin stillage has a lower concentration of suspended solids than whole stillage and is typically of a relatively low viscosity liquid stream. The solids concentration of the thin stillage stream can be increased in an evaporation step where water is evaporated from the thin stillage. Concentrated thin stillage is referred to as syrup in the art. The syrup stream contains an increased concentration of corn oil, which can be separated and sold as distiller's corn oil (DCO). Also, thin stillage includes protein (corn protein and protein material from spent yeast cells) which can be recovered and sold as grain distillers' dried yeast (GDDY). There is a continuing need to provide improved processes for recovering co-products such as GDDY from a biorefinery.

SUMMARY

The present disclosure includes embodiments of a method of evaporating moisture from one or more process streams derived from a beer in a biorefinery, wherein the method includes:

a) recovering at least one recovered solids stream from the one or more process streams derived from a beer, wherein the at least one recovered solids stream has a moisture content of 90% or less on an as-is basis and a suspended solids content of at least 8% on an as-is basis;
b) exposing at least a portion of the at least one recovered solids stream to an evaporator system to remove moisture from the at least a portion of at least one recovered solids stream and form a concentrated, recovered solids stream having a higher suspended solids content on an as-is basis than the at least one recovered solids stream; and
c) drying at least a portion of the concentrated, recovered solids stream in a dryer system to form a dried product.

The present disclosure also includes embodiments of a biorefinery system configured to evaporate moisture from one or more process streams derived from a beer, wherein the system includes:

a) at least one separation system in fluid communication with the one or more process streams derived from the beer, wherein the separation system is configured to recover at least one recovered solids stream from the one or more process streams derived from the beer, wherein the at least one recovered solids stream has a moisture content of 90% or less on an as-is basis and a suspended solids content of at least 8% on an as-is basis;
b) at least one evaporation system in direct or indirect fluid communication with the recovered solids stream, wherein the evaporation system is configured to directly or indirectly receive and expose the at least one recovered solids stream to at least one evaporation process to remove moisture from the at least one recovered solids stream and form a concentrated, recovered solids stream having a higher suspended solids content on an as-is basis than the at least one recovered solids stream; and
c) at least one dryer system configured to receive and dry the concentrated, recovered solids stream to form a dried product.

BRIEF DESCRIPTION OF THE DRAWINGS

FIG. 7 is a flow chart showing one or more additional processes or treatments that a recovered solids stream and/or a concentrated solids stream can be exposed to.

DETAILED DESCRIPTION

Figure 1:
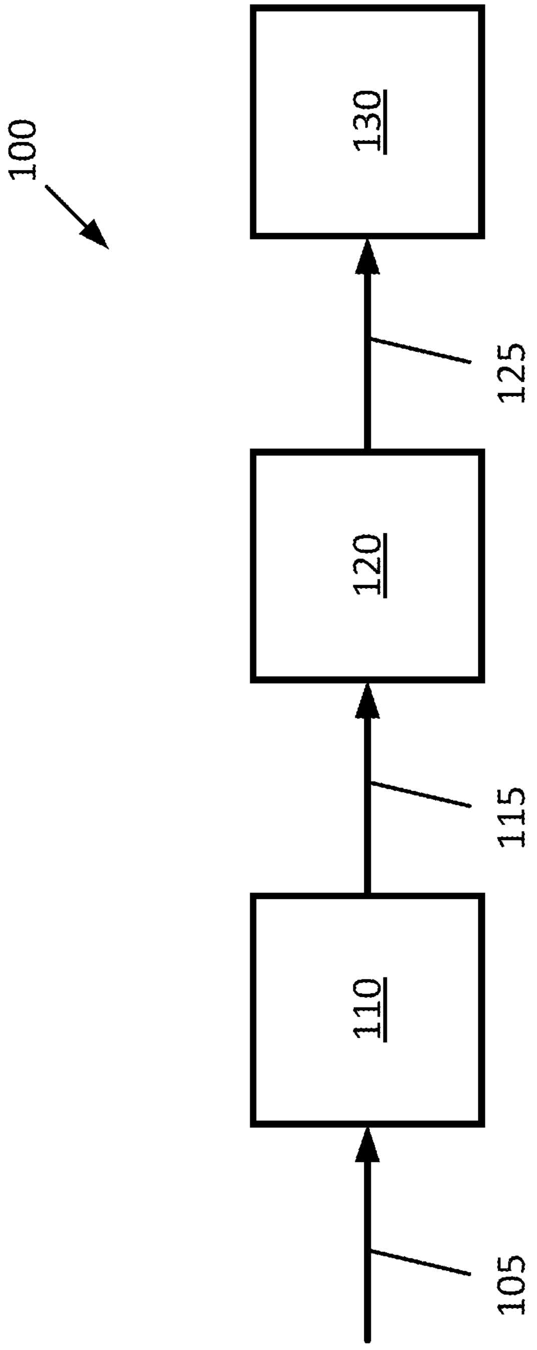
FIG. 1 is a process flow diagram illustrating an embodiment according to the present disclosure that forms a recovered solids stream and then exposes at least a portion of the recovered solids stream to an evaporator system.

The present disclosure relates to methods and systems for concentrating a solids stream (e.g., yeast paste) recovered from a process stream (e.g., thin stillage) in a biorefinery that converts monosaccharides derived from grain-based feedstocks into one or more biochemicals.

Biorefineries can produce a wide variety of biochemicals from micoorganisms such as yeast, bacteria, and the like. For example, a biorefinery can produce one or more alcohols such as ethanol, methanol, butanol, combinations of these, and the like. For example, a biorefinery can make fuel-grade ethanol using a fermentation-based process. Ethanol can be produced from grain-based feedstocks (e.g., corn, sorghum/milo, barley, wheat, soybeans, etc.), or from sugar (e.g., sugar cane, sugar beets, etc.). In an ethanol plant, ethanol is produced from starch contained within the corn, or other plant feedstock. The majority of U.S. ethanol production is from dry mill ethanol facilities that predominately produce ethanol and distillers dried grains with solubles (DDGS). Initial treatment of the feedstock varies by feedstock type. Generally, however, the starch and sugar contained in the plant material is extracted using a combination of mechanical and chemical means. In the case of a corn facility, corn kernels are cleaned and milled to prepare starch-containing material for processing.

The starch-containing material is slurried with water and liquefied to facilitate saccharification, where the starch is converted into sugar (e.g., glucose), and fermentation, where the sugar is converted by an ethanologen (e.g., yeast) into ethanol. The fermentation product is beer, which includes a liquid component having one or more constituents such as ethanol, oil, water, and soluble solid components (dissolved solids such as proteins, vitamins, minerals, and the like), and suspended solids component having one or more constituents such as fiber and protein (corn protein and protein material from spent yeast cells). The fermentation product can be sent to a distillation system where the fermentation product is distilled, and the overhead distillate dehydrated into ethanol. The residual matter (e.g., whole stillage) includes liquid and solid components of the beer with substantially all ethanol removed, which can be dried into dried distillers' grains (DDG) and sold, for example, as an animal feed product. Other co-products (e.g., oil and protein) can also be recovered from the whole stillage.

In a typical ethanol plant, a massive volume of whole stillage is generally produced. In fact, for a typical ethanol plant the amount of whole stillage produced can be nearly 13.4 gallons per bushel of corn processed. Roughly, a third of the corn feedstock is present in the whole stillage as dissolved and suspended solids. The stillage contains almost 90% water. Whole stillage is responsible for a substantial portion of the wastewater generated by ethanol plants. The financial cost of the water, its treatment and disposal can be significant.

While whole stillage, or portions thereof, can be viewed as a cost for an ethanol plant, it is possible to generate one or more high value co-products from the whole stillage. For example, oil and protein feeds are all able to be recovered from whole stillage and sold as higher value co-products. Currently, in the interest of improving efficiencies of ethanol plants, whole stillage is often initially separated into two streams referred to as wet cake and thin stillage. Separation may be performed using centrifugation, and/or filter and press. In some embodiments, the thin stillage may have water removed to concentrate the thin stillage and form syrup. At least a portion of the syrup can be added to the wet cake to increase the fat content of DDG to make DDGS (Distillers Dried Grains with Solubles). This process requires removing a large amount of water from the thin stillage. Thin stillage may also be recycled into the plant, such as for replacement of some portion of the water used during fermentation (fermentation backset).

Further, there is currently a strong push to generate protein and corn oil from thin stillage, as such co-products can be particularly high value commodities. U.S. Pat. No. 9,290,728 (Bootsma); U.S. Pat. No. 10,465,152 (Bootsma); U.S. Pub. No. 2019/0390146 (Bootsma) each report separating one or more process streams such as oil, protein paste, and/or clarified stillage from thin stillage, wherein the entirety of each of said patent document is incorporated herein by reference.

While these known systems and methods may generate valuable co-products from ethanol production, there is a continuing need to recover co-products while efficiently managing water usage, energy usage, and the composition of one or more co-products such as protein products. For example, the amount of water removed (dried from) from a protein paste to produce a dried protein product ("dryer load") increases as the moisture content of the protein paste entering the dryer increases. As the dryer load increases the capacity of a given dryer can be exceeded, which can increase capital expenditures to accommodate the increased dryer load. Such capital expenditures may be used for a larger-capacity dryer and/or ancillary equipment. Increased dryer loads can also cause higher operating costs (natural gas, electrical use) and increased Carbon Intensity (CI).

The present disclosure involves evaporating at least a portion of water from one or more recovered solids streams using an evaporator system in a biorefinery prior to drying the recovered solids stream into a dried product via a dryer system. As used herein, a "recovered solids stream", "solids stream recovered from", and similar phrases involving "recovered" and "solids" refer to a stream that has been recovered from a process stream (or multiple process streams combined together) in a biorefinery, where the process stream is derived from a beer that includes one or more biochemicals such as ethanol, butanol, and the like that are made in the biorefinery. Referring to FIG. 1, biorefinery 100 includes a beer stream 105 that is exposed to one or more unit operations 110 that form at least one process stream 115. The process stream 115 can be separated in separation system 120 to form at least a recovered solids stream 125, which can then be exposed to an evaporator system 130. As explained further below, an example of a process stream is thin stillage in a dry grind corn ethanol plant and the recovered solids stream is yeast paste used to make dried yeast paste product. Removing water via evaporation from a yeast paste stream prior to drying can advantageously reduce the load on a dryer to produce the final dried product. However, the yeast paste stream and/or a concentrated, yeast paste stream can be relatively higher in viscosity and/or more challenging to transfer through downstream process equipment as compared to the stream it was derived from. Also, while not being bound by theory, it is believed that in some embodiments, the evaporative cooling effect that results from the phase change of liquid water to water vapor may reduce the heat exposure of the protein in a yeast paste stream that may otherwise occur, while at the same time drying the yeast paste as desired. For example, a subsequent drying process to form a dried product (e.g., GDDY) can be a relatively high temperature as compared to a temperature protein may be exposed to during evaporation in an evaporator system. Also, by removing moisture from the yeast paste via an evaporator system according to the present disclosure, in some embodiments, a subsequent drying process may be accomplished in a relatively shorter time period and/or at a relatively lower temperature, thereby improving the quality of at least some of the protein content.

A variety of separation techniques can be used to recover a solids stream (e.g., yeast paste stream) from a process stream in a biorefinery according to the present disclosure so as to form a stream that is relatively less concentrated in liquid (e.g., moisture) and relatively more concentrated in solids before exposing the recovered solids stream to an evaporator system to further concentrate the recovered solids stream and form a concentrated, recovered solids stream. For example, a solids stream can be recovered from a process stream using mechanical separation systems that separate process streams based on differences in sizes of stream components, differences in densities of stream components, combinations of these, and the like. A separation system can be selected and operated to provide a desired moisture content and solids content in the recovered solids stream as described herein. It is noted that the separated system can be configured to form a concentrated, recovered solids stream having one or more properties that permit it to be transferred through an evaporator system and any downstream process equipment without undue fouling, clogging, and the like. Such properties include one or more of viscosity, suspended solids content, soluble solids content, and the like.

Non-limiting examples of separation systems that can be used to separate a process stream into one or more recovered solids streams according to the present disclosure include systems having one or more centrifuges (e.g., two-phase vertical disk stack centrifuge, three-phase vertical disk stack centrifuges), one or more decanters (e.g., filtration decanters), one or more filters, combinations of these and the like. An example of recovering protein and yeast from thin stillage using filtration is reported in U.S. Pat. No. 8,257,951 (Prevost et al.), wherein the entirety of said patent is incorporated herein by reference. Multiple separation systems can be used together and arranged in a parallel and/or series configuration. Depending on the separation system selected, one or more process input streams can be separated into two or more output streams to recover an output stream that has a higher amount of solids (e.g., protein) as compared to other output streams.

Figure 2:
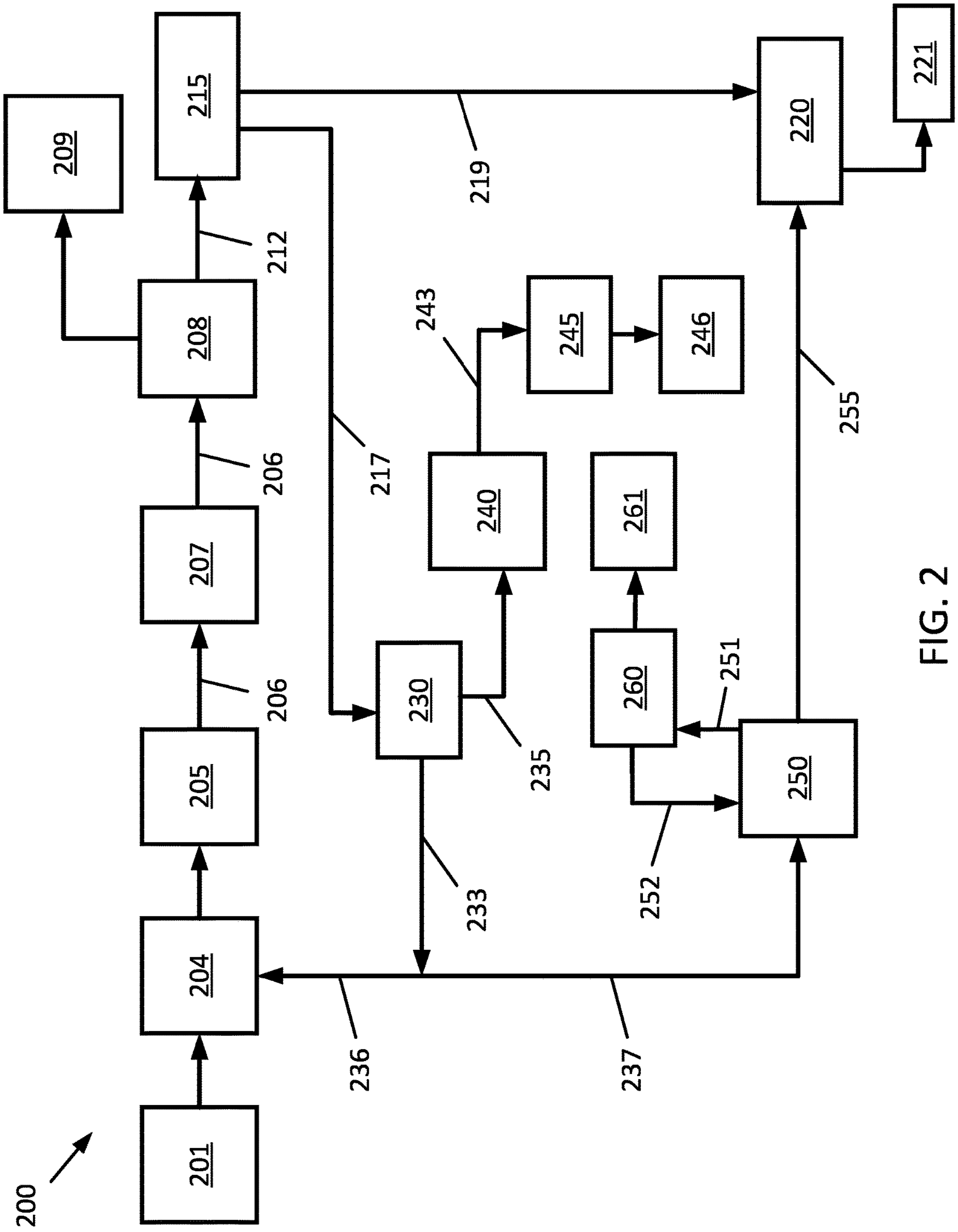
FIG. 2 is a process flow diagram illustrating an embodiment according to the present disclosure of a dry mill ethanol distillation process that includes exposing a recovered solids stream such as yeast paste to an evaporator system to form a concentrated yeast paste stream and drying the concentrated yeast paste stream in a dryer system to form grain distillers' dried yeast (GDDY)

One or more process streams in a biorefinery can be selected for recovering a solids stream according to the present disclosure. In some embodiments, recovering a solids stream for producing a dried protein product that includes corn protein and/or protein material from spent yeast can occur at one or more locations in a biorefinery that are downstream from fermentation. For example, one or more solids streams can be recovered from one or more process streams in a biorefinery for producing a dried protein product that includes corn protein and/or protein material from spent yeast can occur before and/or after distillation. As discussed below, FIG. 2 shows recovering a yeast paste stream 235 from thin stillage 217, which is downstream from distillation 208. Alternatively, or in addition to the yeast paste stream 235 in FIG. 2, at least a portion of the beer 206 could be separated from the process flow in in FIG. 2 before distillation 208 to recover a yeast paste stream. A non-limiting example of a process stream that can used as an input stream for recovering a solids stream prior to distillation is fermentation product stream 32 in U.S. Pat. No. 8,449,728 (Redford), wherein the entirety of said patent is incorporated herein by reference. Another non-limiting example of a process stream that can used as an input stream for recovering a solids stream prior to distillation is fine solids and liquid stream 30 in U.S. Patent Publication 2015/0181911 (Redford), wherein the entirety of said patent publication is incorporated herein by reference.

For illustration purposes, an example of forming a recovered solids stream and evaporating at least a portion of water from the recovered solids stream in an evaporator system of a biorefinery prior to drying the recovered solids stream into a dried product according to the present disclosure is described below with respect to FIG. 2. In this process 200, corn is first ground 201 into a flour with one or more hammermills. The corn flour can be mixed with various sources of water and enzymes in the slurry or liquefaction step 204. In some processes, such as the BPX process utilized by POET, the corn slurry is mixed at relatively low temperatures, approximately 90° F. to 100° F., and sent directly to the fermentation 205 without any additional processing. This process is commonly referred to as raw starch hydrolysis. In other processes, such as the traditional liquefaction process, the corn slurry is mixed at elevated temperatures, approximately 150° F.-200° F., and then maintained at that temperature for an extended period of time to allow the enzymes to reduce the viscosity (or liquefy) the corn slurry. Some processes may also employ a short time, high temperature cooking process up to approximately 250° F. to improve the liquefaction of the corn slurry. In some embodiments, enzymes are added before and after the high temperature cooking process due to enzyme denaturation that may occur.

The corn slurry, or liquefied corn slurry, can then be fermented with an ethanologen such as *Saccharomyces cerevisiae* yeast in a simultaneous saccharification and fermentation (or SSF) mode. In this mode, enzymes added to the slurry convert the corn starch into soluble glucose at the same time as the yeast converts the soluble glucose into ethanol and carbon dioxide. After the fermentation 205 is complete, the resulting fermentation broth, or beer 206, is collected in a beer well 207. Alternatively, instead of SSF mode, saccharification and fermentation can occur sequentially in the same vessel or different vessels.

Although not shown in FIG. 2, one or more solids streams can be recovered from the beer 206 before distillation 208 so that at least a portion of water from the one or more recovered solids streams can be exposed to an evaporator system according to the present disclosure, e.g., prior to drying the recovered solids stream into a dried product (e.g., dried yeast paste).

As shown in FIG. 2, beer 206 is distilled in order to separate the ethanol 209 from the water and remaining solids. The whole stillage 212 from the distillation 208 is processed in a separation system 215 into thin stillage 217 and wet cake 219. In an illustrative embodiment, separation system 215 can include one or more decanters (e.g., from 2-6 horizontal decanters in parallel). The wet cake 219 includes a large portion of corn fiber suspended solids from the whole stillage 212. The wet cake 219 is sometimes sold as an animal feed as-is (distiller's wet grains). But, as shown in FIG. 2, most often the wet cake 219 from separation system 215 (e.g., output from multiple decanters is combined) can be provided to a dryer system 220 that includes a single (First Stage Dryer) dryer in dryer system 220 to form distiller's dried grains (DDG).

The thin stillage 217 from the separation system 215 is primarily a liquid that includes dissolved solids and suspended solids. The liquid can include water and oil, but a large portion of the liquid is water. The dissolved solids can include one or more of saccharides and protein (e.g., soluble corn gluten protein). Thin stillage 217 can also include fine suspended solids. The fine suspended solids include protein such as grain protein (e.g., corn protein) and yeast protein from spent yeast cells.

In some embodiments, the thin stillage 217 from the separation system 215 can be transferred to a single tank (not shown).

According to the present disclosure, a recovered solids stream such as a "yeast paste" stream 235 can be recovered from thin stillage 217 using a separation system 230 as described above. As used herein, a "yeast paste" stream 235 can include at least moisture and protein material from spent yeast cells. Yeast paste 235 can also include one or more of oil, dissolved minerals, sugar and/or starch, dissolved protein, and suspended protein and/or corn fiber. In addition to the protein material from spent yeast cells, dissolved and suspended protein can also include grain protein such as corn protein. In some embodiments, thin stillage 217 can be separated into a yeast paste stream 235 and one or more other process streams. In some embodiments, a yeast paste stream can be separated from one or more process streams downstream from and derived from thin stillage. As shown in FIG. 2, the thin stillage 217 can be separated into a clarified thin stillage stream 233 and a yeast paste stream 235.

The clarified thin stillage stream 233 can be transferred directly or indirectly to the slurry or liquefaction step 204 as backset 236 and the remaining clarified thin stillage 237 can be fed to an evaporator train 250, made up of 4-8 evaporators in series (depending on plant size) to remove water and form syrup 255. Prior to reaching the end of the evaporator train 250, a semi-concentrated syrup 251 is sent to an oil recovery system 260 (e.g., POET's Voilà® oil recovery system), which removes corn oil 261. The residual stream 252 containing little to no corn oil, is sent back to the evaporator train 250 to produce syrup 255. Non-limiting descriptions of oil recovery systems are reported in each of U.S. Pat. No. 9,061,987 (Bootsma), U.S. Pat. No. 8,702,819 (Bootsma), U.S. Pat. No. 9,695,449 (Bootsma), U.S. Pat. No. 10,851,327 (Urban et al.), and 2021-0002584 (Urban et al.), wherein the entireties of said patent documents are incorporated herein by reference.

It is noted that the residual stream 252 may include protein. Thus, residual stream 252 is another example of a process stream from which a recovered solids stream can be separated from according to the present disclosure, followed by being exposed to, directly or indirectly, an evaporator system.

The syrup 255 can be combined with the First Stage Dryer Discharge in a single Second Stage Dryer of the dryer system 220 and dried down to approximately 10% moisture and sold as distiller's dried grains with solubles (DDGS) 221.

In some embodiments, a recovered solids stream (e.g., yeast paste stream) according to present disclosure is used to ultimately form a dried solids product, therefore, it tends to be relatively more concentrated in suspended solids as compared to the process stream it was recovered from. In some embodiments, a recovered solids stream has a suspended solids content of at least 8% on an as-is basis, at least 10% on an as-is basis, at least 15% on an as-is basis, at least 20% on an as-is basis, or even at least 25% on an as-is basis. In some embodiments, a recovered solids stream has a suspended solids content from 8 to 35% on an as-is basis, from 10 to 30% on an as-is basis, from 15 to 25% on an as-is basis, or even from 15 to 20% on an as-is basis. The suspended solids can include one or more of protein (from yeast and/or grain such as corn), fat, ash, and carbohydrates (e.g., fiber and/or starch). In some embodiments, a recovered solids stream has protein suspended solids content from 40-75%, from 40-65%, from 40 to 60%, or even from 45-60% by total weight of the suspended solids. Likewise, a recovered solids stream according to present disclosure can have relatively less moisture (water) as compared to the process stream it was recovered from. In some embodiments, a recovered solids stream has a moisture content of 90% or less on an as-is basis, 88% or less on an as-is basis, 80% or less on an as-is basis, 75% or less on an as-is basis, 70% or less on an as-is basis, or even 60% or less on an as-is basis. In some embodiments, a recovered solids stream has a moisture content from 60 to 90% on an as-is basis, from 60 to 75% on an as-is basis, or even from 75 to 88% on an as-is basis. The balance of a recovered solids stream can include soluble solids, which in some embodiments include one or more of soluble protein, soluble mineral, soluble vitamins, and the like. In some embodiments, a recovered solids stream can have a total solids content (dissolved and suspended solids) from 10 to 40%, from 12 to 30%, from 18-25%, from 25-35%, or even from 26-35% on an as-is basis.

As used herein, referring to the amount of a component on an "as-is basis" means that moisture is included to describe the degree of concentration of dissolved and/or suspended solids. Unless noted otherwise, the amounts are on a weight basis.

Evaporator System

According to present disclosure, at least a portion of water can be evaporated from a recovered solids stream via an evaporator system to form a concentrated, recovered solids stream having a lower moisture content and a higher concentration of suspended solids on an as-is basis as compared to the recovered solids stream from which water is evaporated from. In some embodiments, after the evaporator system, the concentrated, solids stream is exposed, directly or indirectly, to a dryer system to form a dried solids product (e.g., dried yeast paste). For example, a recovered solids stream can be considered at least partially concentrated in suspended solids as compared to the process stream that it was recovered from. Removing water from the recovered solids stream via an evaporator system to form an even more concentrated, recovered solids stream prior to drying the concentrated, recovered solids stream in a dryer system can advantageously reduce the load on the dryer system that produces the final dried product. Referring to FIG. 2, the yeast paste stream 235 recovered from thin stillage 217 has less water than the thin stillage 217 and is more concentrated in protein (corn protein and/or protein material from spent yeast cells). As shown, the yeast paste stream 235 is exposed to an evaporator system 240 to remove water and form a condensed yeast paste stream 243 prior to being dried in a dryer system 245 to form grain distillers dried yeast (GDDY) 246.

During evaporation in an evaporator system, a recovered solids stream can be exposed to temperature, pressure and humidity conditions to cause water to evaporate and be removed from the recovered solids stream and form a concentrated recovered solids stream.

A variety of evaporator systems can be used to remove moisture from a recovered solids stream and form a concentrated recovered solids stream having a higher suspended solids content on an as-is basis as compared to the recovered solids stream. Because a recovered solids stream is relatively more concentrated in solids than the stream it was recovered from, it can be higher in viscosity and/or more challenging to transfer through downstream process equipment, which is a consideration when selecting an evaporator system (equipment, flowrates, etc.) for a recovered solids stream according to the present disclosure.

In some embodiments, an evaporator system includes one or more heat exchangers arranged in series and/or parallel configurations that can transfer heat from a heat source to the recovered solids stream to heat the water in the recovered solids stream and cause at least a portion of the water in the recovered solids stream to evaporate. Non-limiting examples of such heat sources include heat sources on the jacket side of a heat exchanger that indirectly heat the recovered solids stream and include steam or hot liquid mediums such as hot water, hot oil, or molten salt. An evaporator system can be operated at one or more operating temperatures and pressures, which can be selected depending on one or more factors such as type of evaporator system and evaporator system configuration.

Non-limiting examples of evaporator systems can be described by the type of heat transfer, which include a once through falling film evaporator system, a recirculated falling film evaporator system, a natural circulation evaporator system, a forced circulation evaporator system, and the like.

For illustration purposes, a falling film evaporator system will now be described. In some embodiments, a falling film evaporator system includes a shell and tube heat exchanger in a vertical position, where the recovered solids stream is fed at the top of the heat exchanger to rely on gravity for the recovered solids stream to flow down the tube walls and through the heat exchanger to be heated and cause evaporation. A falling film evaporator system can facilitate processing relatively more viscous materials. In some embodiments, distributers and/or spray nozzles can be used to help distribute the recovered solids stream among the tubes in the heat exchanger in a uniform manner. Also, the diameter of the tubes can be selected to accommodate higher solids streams to prevent undue fouling. Flow of vapor and liquid may be either co-current, in which case vapor-liquid separation takes place at the bottom, or countercurrent (the liquid is withdrawn from the bottom and the vapor from the top). For co-current flow, the vapor shear-force can thin the film, and produce relatively higher heat-transfer coefficients. Also, since the vapor is in contact with the hottest liquid at the point of withdrawal, stripping tends to be more efficient.

In some embodiments, a recovered solids stream (e.g., yeast paste stream) can be heated in a falling film evaporator system to at least the temperature that water boils at for a given pressure. For example, a recovered solids stream can be heated to a temperature of at least 212° F. while exposed to atmospheric pressure (e.g., 14.7 psia) or less.

For illustration purposes, another non-limiting example of an evaporator system is described herein below with respect to what is referred to as a suppressed boiling evaporator system. Suppressed boiling occurs when the recovered solids stream has sufficient heat input into the liquid phase in a heat exchanger, as sensible heat under pressure, such that after exiting the exchanger it can be flashed. An example of a heat exchanger that can be used in a suppressed boiling evaporator is a plate and frame heat exchanger or a shell and tube heat exchanger. Relatively large heat transfer areas can be packed into a smaller volume and heat-transfer coefficients tend to be higher for plate and frame heat exchangers as compared to tubular evaporators. Also, fouling tends to be less since the action of fluid flow can cause a scouring action on the plate surface. Plate and frame heat exchangers can preserve product quality since exposure to high temperature tends to occur for a relatively short time period.

In some embodiments, a recovered solids stream (e.g., yeast paste stream) can be heated in a suppressed boiling evaporator system to at least the temperature at least 250° F. while exposed to a pressure above 30 psia. Water can flash from liquid to vapor when the pressure is reduced (e.g., to atmospheric pressure, 14.7 psia).

For illustration purposes, another non-limiting example of an evaporator system is described herein below with respect to what is referred to as a wiped film evaporator system. A wiped film evaporator includes large-diameter jacketed tubes, in which the recovered solids stream can be wiped over the heat exchange surface (tube wall) by rollers or wipers. Blades can be pitched blades for high viscosity applications. The recovered solids stream can be continuously spread as a film on the tube wall by mechanical wipers. This can permit processing relatively viscous and heat-sensitive materials. A wiped film evaporator may be horizontal, vertical, or inclined. The heat-transfer tubes can be from 3 to 48 inches in diameter and from 2 to 75 ft. in length. A system for evaporating a recovered solids stream according to the present disclosure can include one or more evaporator systems as described herein.

Two or more evaporator systems of the same or different type may be coupled to each other in a series and/or parallel configuration. In some embodiments, a recovered solids stream can be exposed to up to eight evaporator systems in series (also referred to as an "evaporator train").

A wide variety of auxiliary equipment can be included in an evaporation system such as piping, pumps, and the like.

Figure 3A:
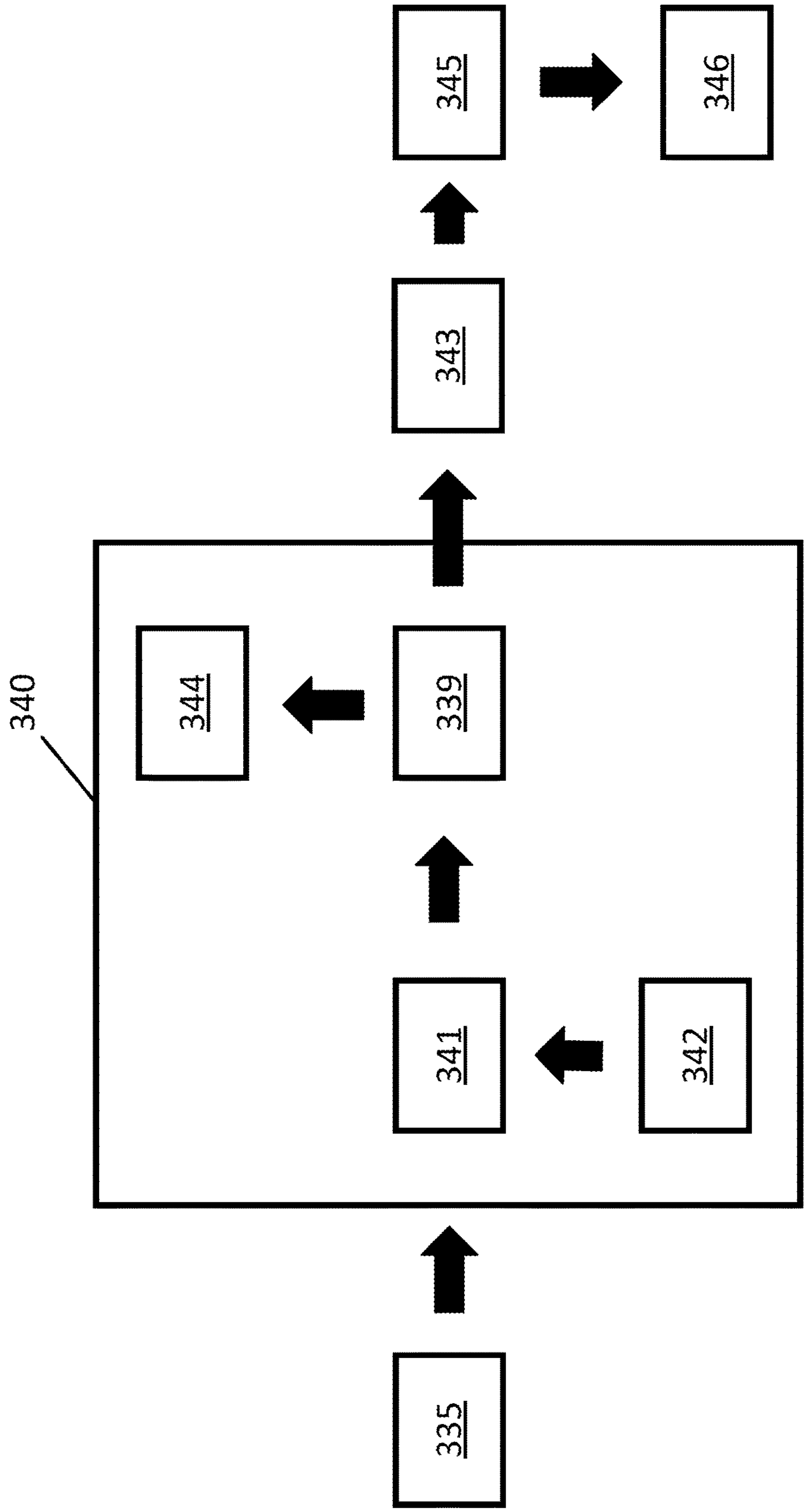
FIG. 3A shows a non-limiting embodiment of a process flow schematic illustrating an evaporator system according to an aspect of the present disclosure.
Figure 3B:
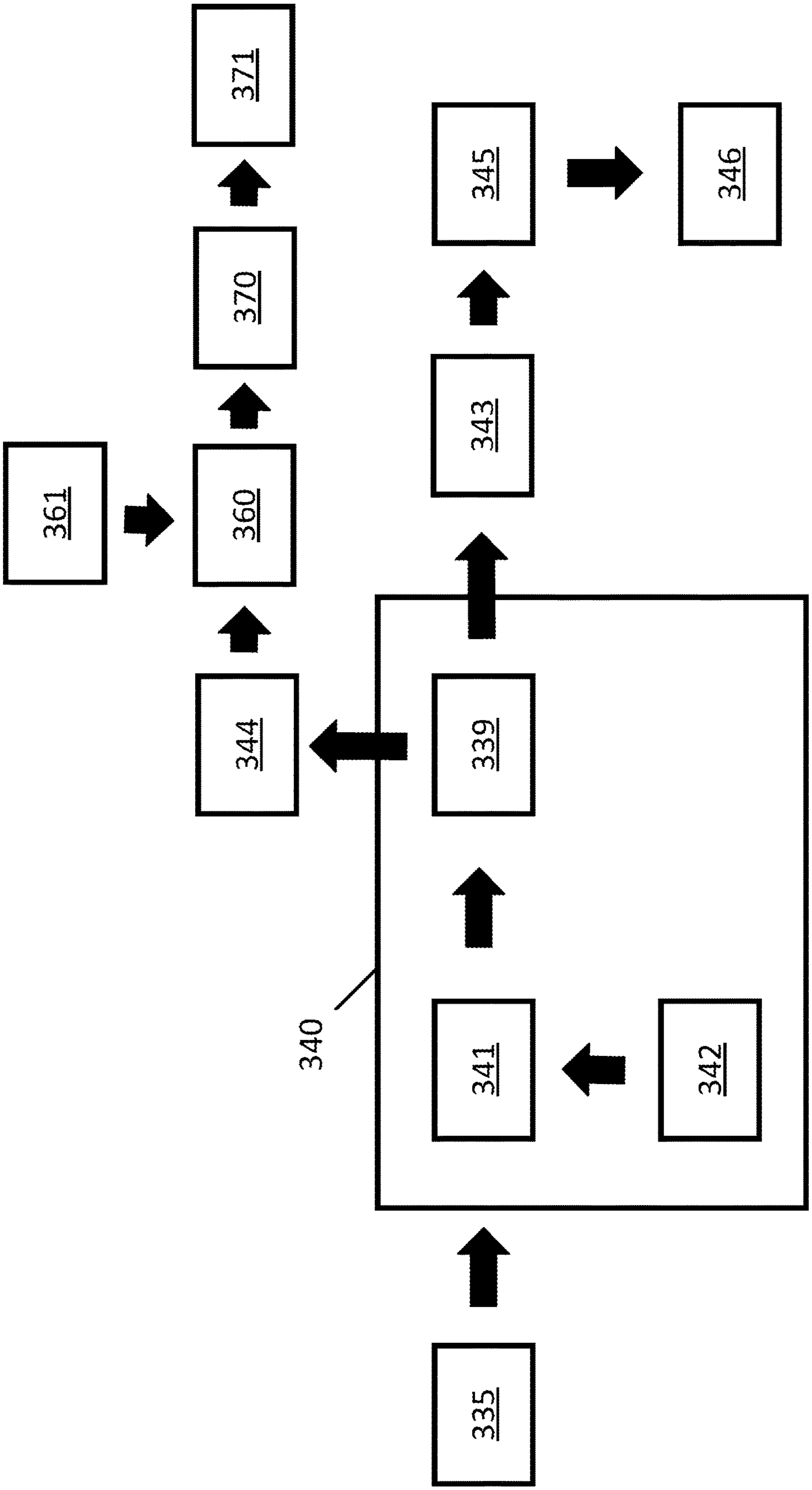
FIG. 3B shows another non-limiting embodiment of a process flow schematic similar to FIG. 3A and further including an example of using evaporated water vapor for process water in a biorefinery.

Non-limiting illustrations of process flow schematics of evaporator systems such as 240 are illustrated with respect to FIGS. 3A and 3B.

FIG. 3A shows a non-limiting embodiment of exposing a yeast paste stream 335 to an evaporator system 340 to form a condensed (concentrated) yeast paste stream 343, which can be dried in a dryer system 345 to form GDDY 346. As shown, the yeast paste stream 335 is passed through a heat exchanger 341 so that it can be heated by indirect contact with a heat source such as steam or hot water 342. The yeast paste stream 335 is heated to a temperature and at a pressure so that at least a portion of the liquid water in the yeast paste evaporates to water vapor 344, thereby reducing the moisture content of the yeast paste to form a condensed yeast paste stream 343. For example, the yeast paste stream 335 can be heated in a first vessel (heat exchanger 341) to a temperature of at least 165° F. (or even at least 170° F., at least 175° F., or even at least 176° F.) while at atmospheric pressure (e.g., 14.7 psia) followed by flashing in a separate vessel 339 that is under vacuum (e.g., at a pressure of 7 psia or less). In some embodiments, at least a portion of the water vapor 344 can be used as process steam at one or more locations within a biorefinery (e.g., as illustrated in FIG. 3B, which is discussed below).

Although FIG. 3A schematically shows heating in heat exchanger 341 and evaporating separately in flash tank 339, heating and evaporating could occur in the same vessel.

FIG. 3B shows another non-limiting embodiment of exposing a yeast paste stream 335 to an evaporator system 340 to form a condensed (concentrated) yeast paste stream 343, which can be dried in a dryer system 345 to form GDDY 346. Like FIG. 3A, the yeast paste stream 335 in FIG. 3B is passed through an evaporator system 340 that includes a heat exchanger 341 so that the yeast paste stream 335 can be heated by indirect contact with a heat source 342 such a steam or hot water. The yeast paste stream 335 is heated to a temperature and at a pressure so that at least a portion of the liquid water in the yeast paste stream 335 evaporates to water vapor 344, thereby reducing the moisture content of the yeast paste stream 335 to form a condensed yeast paste stream 343.

Like FIG. 3A, FIG. 3B schematically shows heating and evaporating separately, where the yeast paste stream 335 is superheated and then exposed to a reduced pressure in flash tank 339 to cause liquid water to flash to water vapor 344 at the reduced pressure (e.g., atmosphere or vacuum).

As shown in FIG. 3B, in some embodiments, at least a portion of the water vapor 344 can be used as process steam at one or more locations within a biorefinery by passing the water vapor through a heat exchanger 360 and condensing it using a cooling source 361 into a condensate 371 that can be used as process water at one or more locations in a biorefinery. Optionally, a vacuum 370 may be applied to facilitate evaporating moisture from the yeast paste stream 335 at a relatively lower temperature.

Figure 4:
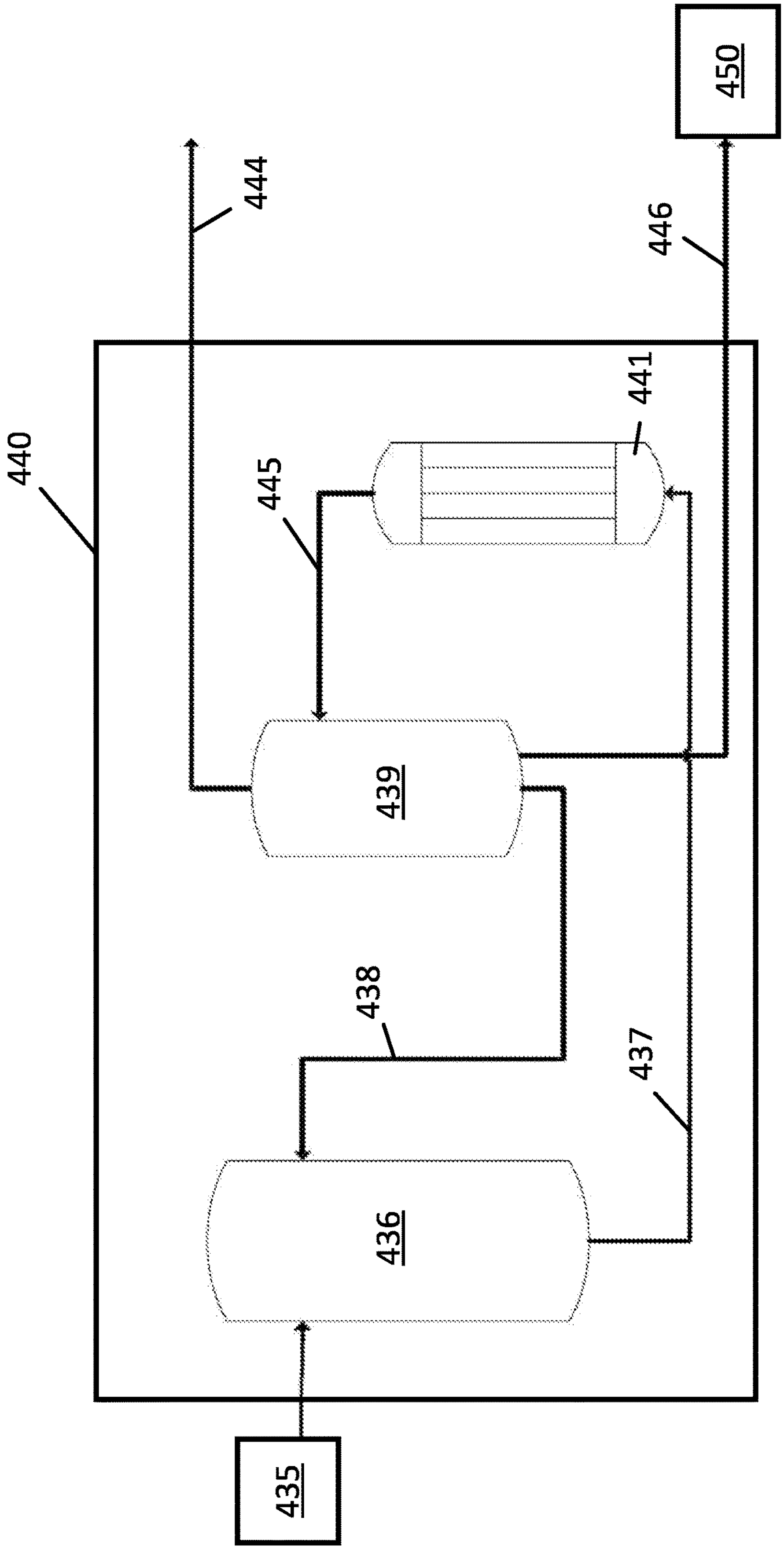
FIG. 4 shows another non-limiting embodiment of a more detailed process flow schematic illustrating an evaporator system according to an aspect of the present disclosure.
Figure 5:
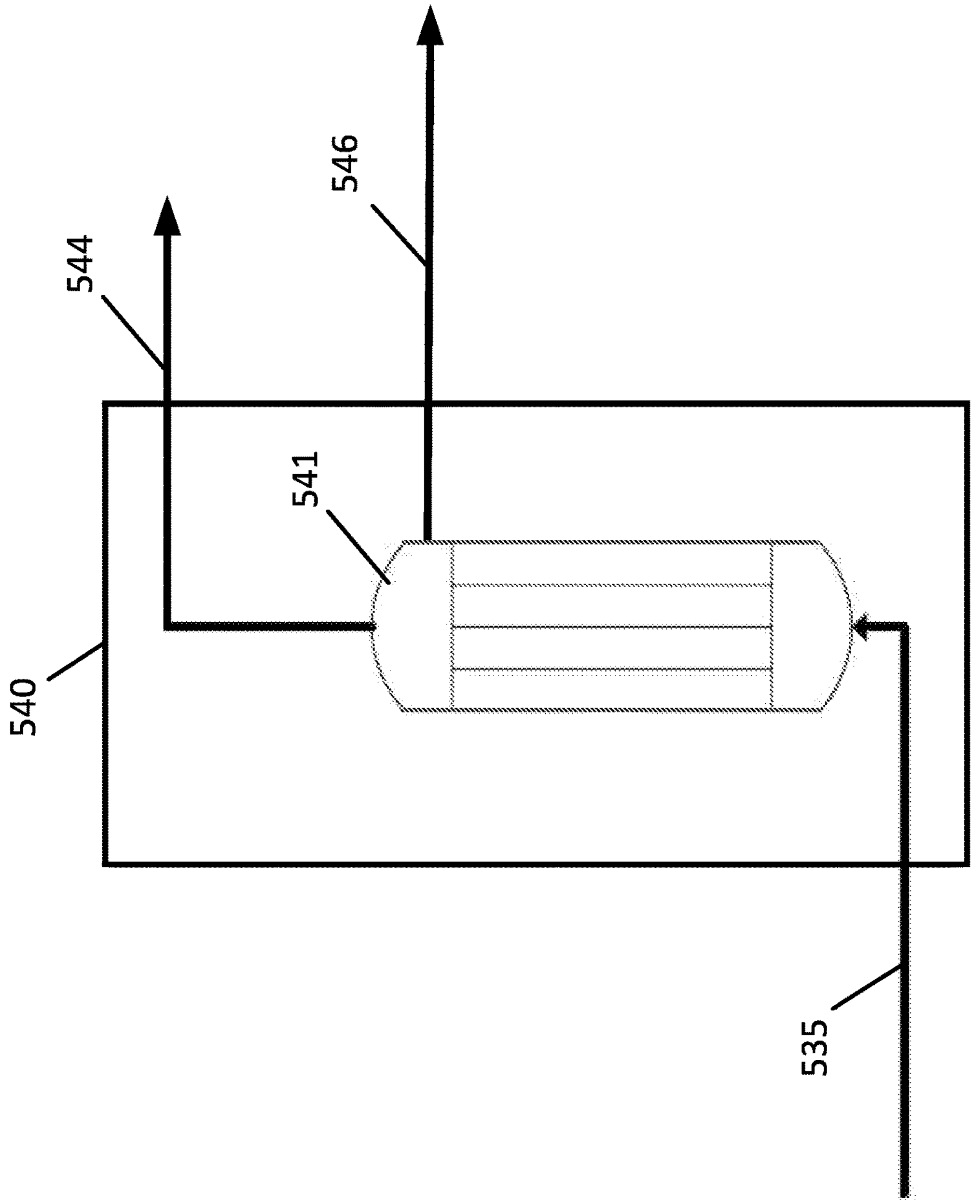
FIG. 5 shows another non-limiting embodiment of a more detailed process flow schematic illustrating an evaporator system according to an aspect of the present disclosure.
Figure 6:
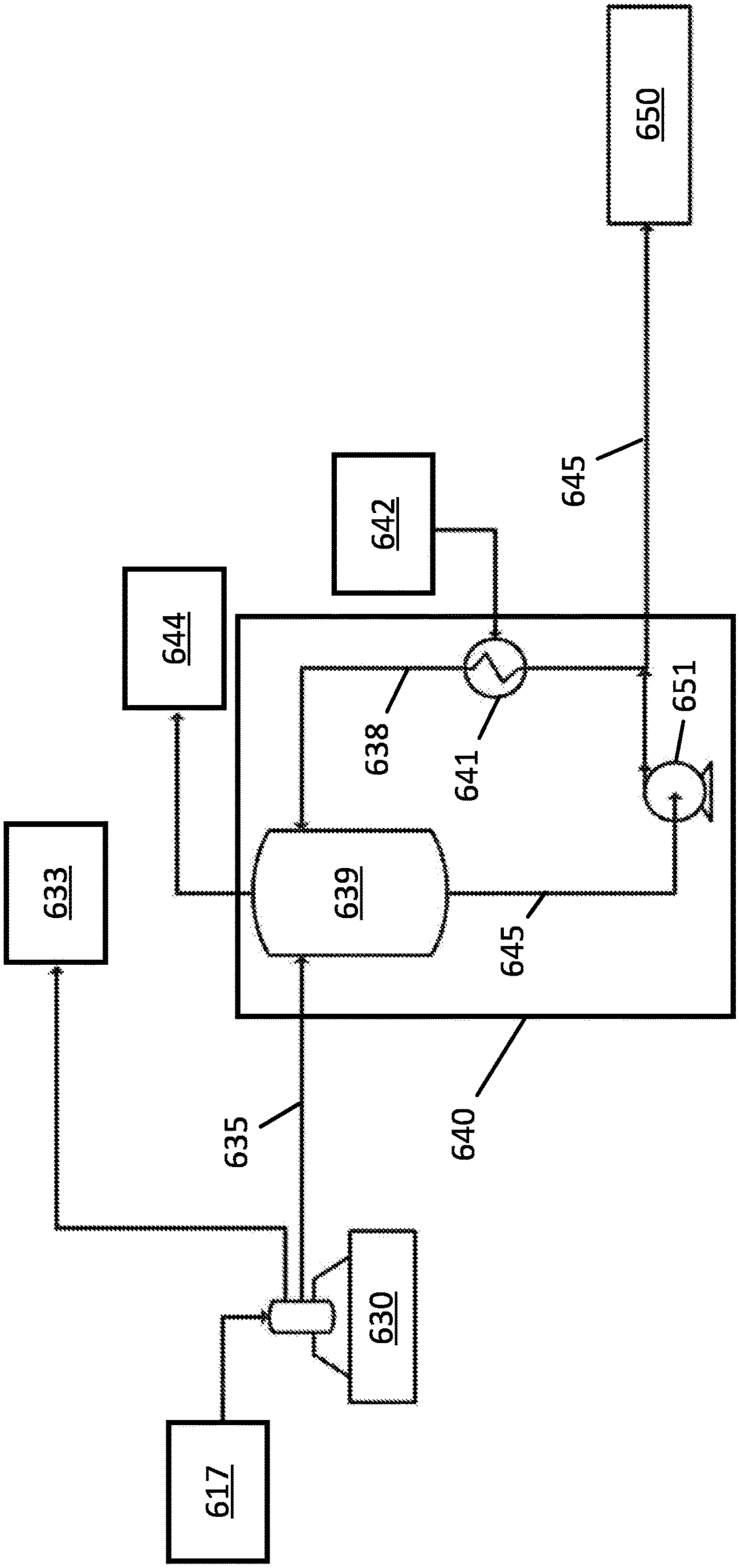
FIG. 6 shows another non-limiting embodiment of a more detailed process flow schematic illustrating an evaporator system according to an aspect of the present disclosure.

Each of FIGS. 4, 5, and 6 show more detailed process flow schematics of non-limiting embodiments of exposing a yeast paste stream to an evaporator system according to the present disclosure.

FIG. 4 shows an embodiment of an evaporator system 440 that includes a forced circulation heat exchanger and suppressed boiling configuration to concentrate a yeast paste stream according to the present disclosure. As shown in FIG. 4, a yeast paste stream 435 from a separation system goes into a yeast paste tank 436. From the yeast paste tank 436, the "pre-heated" yeast paste 437 is fed to a forced circulation, shell and tube evaporator, which includes a shell and tube heat exchanger 441 and an evaporation flash tank 439.

After being further heated in the heat exchanger 439, the heated yeast paste 445 is pumped to an evaporator flash tank 439 to remove water vapor 444. At least part of the concentrated yeast paste that has been exposed to the evaporator system 440 is then then transferred downstream to a dryer 450 via stream 446. The remaining concentrated yeast paste is transferred to the yeast paste tank 436 via stream 438 and recycled through the evaporator system 440. In some embodiments, evaporator system 440 can concentrate yeast paste stream 435 by at least 0.1% solids content, at least 0.5% solids content, at least 1% solids content, at least 2% solids content, at least 5% solids content, or even at least 10% solids content. Advantageously, in some embodiments, evaporator system 440 can save in gas costs with respect to a downstream dryer system and/or provide a lower carbon intensity ("CI") due to less natural gas being used at a dryer.

FIG. 5 shows another embodiment of an evaporator system 540 that includes a forced circulation heat exchanger configuration to concentrate a yeast paste stream according to the present disclosure. The evaporator system 540 has similarities to evaporator system 440, but one difference is that heating and evaporating occur in the same vessel 541 and yeast paste stream is not "pre-heated" in a yeast paste tank. As shown in FIG. 5, a yeast paste stream 535 from an upstream separation system is fed to heat exchanger 541, which is a forced circulation, shell and tube heat exchanger.

The yeast paste stream 535 is heated in heat exchanger 541 to remove water vapor 544 via evaporation and form concentrated yeast paste stream 546, which can be transferred downstream to a dryer. In some embodiments, evaporator system 540 can concentrate yeast paste stream 535 by at least 0.1% solids content, at least 0.5% solids content, at least 1% solids content, at least 2% solids content, at least 5% solids content, or even at least 10% solids content. Advantageously, in some embodiments, evaporator system 540 can save in gas costs with respect to a downstream dryer system and/or provide a lower carbon intensity ("CI") due to less natural gas being used at a dryer. FIG. 6 shows another embodiment of an evaporator system 640 that includes a forced circulation heat exchanger and suppressed boiling configuration to concentrate a yeast paste stream according to the present disclosure. In FIG. 6, the yeast paste stream 635 is obtained by separating thin stillage 617 in, e.g., a two-phase disk stack centrifuge 630 into a clarified thin stillage stream 633 and the yeast paste stream 635. Alternatively, the thin stillage 617 could be separated using another separation device or system as described herein above. As shown, the yeast paste stream 635 from the centrifuge 630 is heated in a single yeast paste evaporation tank 639 with re-circulated, condensed yeast paste 638, which was heated in a heat exchanger 641 by indirect contact with a heating medium such as steam 642. While in the tank 639, the incoming yeast paste stream 635 is heated to a temperature and at a pressure so that at least a portion of the liquid water in the yeast paste stream 635 evaporates to water vapor, thereby reducing the moisture content of the yeast paste stream 635 to form a condensed yeast paste stream 645, which can be pumped by pump 651. As shown in FIG. 6, after pump 651 a portion of the condensed yeast paste stream 645 is provided to heat exchanger 641 and a portion of the condensed yeast paste stream 645 is provided to dryer system 650 to be dried and form GDDY. In some embodiments, the flashed water vapor 644 can be used as process stream at one or more locations within a biorefinery.

In some embodiments, a concentrated, recovered solids stream formed by evaporation according to present disclosure is ultimately used to form a dried solids product. Therefore, it can be desirable for a concentrated, recovered solids stream to be relatively more concentrated in at least suspended solids (and have less moisture) as compared to the recovered solids stream it was concentrated from. In some embodiments, a concentrated, recovered solids stream has a suspended solids content of at least 12% on an as-is basis, at least 13% on an as-is basis, at least 15% on an as-is basis, or even at least 20% on an as-is basis. In some embodiments, a concentrated, recovered solids stream has a suspended solids content from 13 to 40% on an as-is basis, from 15 to 25% on an as-is basis, or even from 20 to 25% on an as-is basis. Likewise, a concentrated, recovered solids stream according to present disclosure can have relatively less moisture (water) as compared to the recovered stream it was concentrated from. In some embodiments, a concentrated, recovered solids stream has a moisture content of 85% or less on an as-is basis, 80% or less on an as-is basis, 75% or less on an as-is basis, or even 40% or less on an as-is basis. In some embodiments, a concentrated, recovered solids stream has a moisture content from 20 to 80% on an as-is basis, from 20 to 70% on an as-is basis, from 20 to 60% on an as-is basis, from 50 to 80% on an as-is basis, or even from 60 to 80% on an as-is basis. In some embodiments, a concentrated, recovered solids stream can have a total solids (dissolved and suspended solids) from 15 to 85% on an as-is basis, or even from 15 to 85% on an as-is basis.

A recovered solids stream can be transferred directly or indirectly to an evaporator system. For example, referring again to FIG. 2, the yeast paste stream 235 is transferred directly to the evaporator system 240 to form the concentrated yeast paste stream 243. Optionally, the recovered solids stream could first be exposed to one or more processes such as one or more of those described in FIG. 7 below before being exposed to an evaporator system to form a concentrated, recovered solids stream. Likewise, a concentrated, recovered solids stream can optionally be exposed to one or more additional processes or treatments after being exposed to an evaporator system, but before being dried in a dryer system.

It is noted that one or more of the evaporator systems described herein can also be used to produce a concentrated liquid product such as a syrup 255 from thin stillage. As mentioned above, according to the present disclosure, it has been discovered that such evaporator systems can also be used to concentrate a recovered solids stream such as a yeast paste stream, which can be recovered from a thin stillage stream as shown in FIG. 2, thereby reducing the load on a subsequent dryer system that produces a final dried product via a dryer system.

Optional Process Operations

Figure 7:
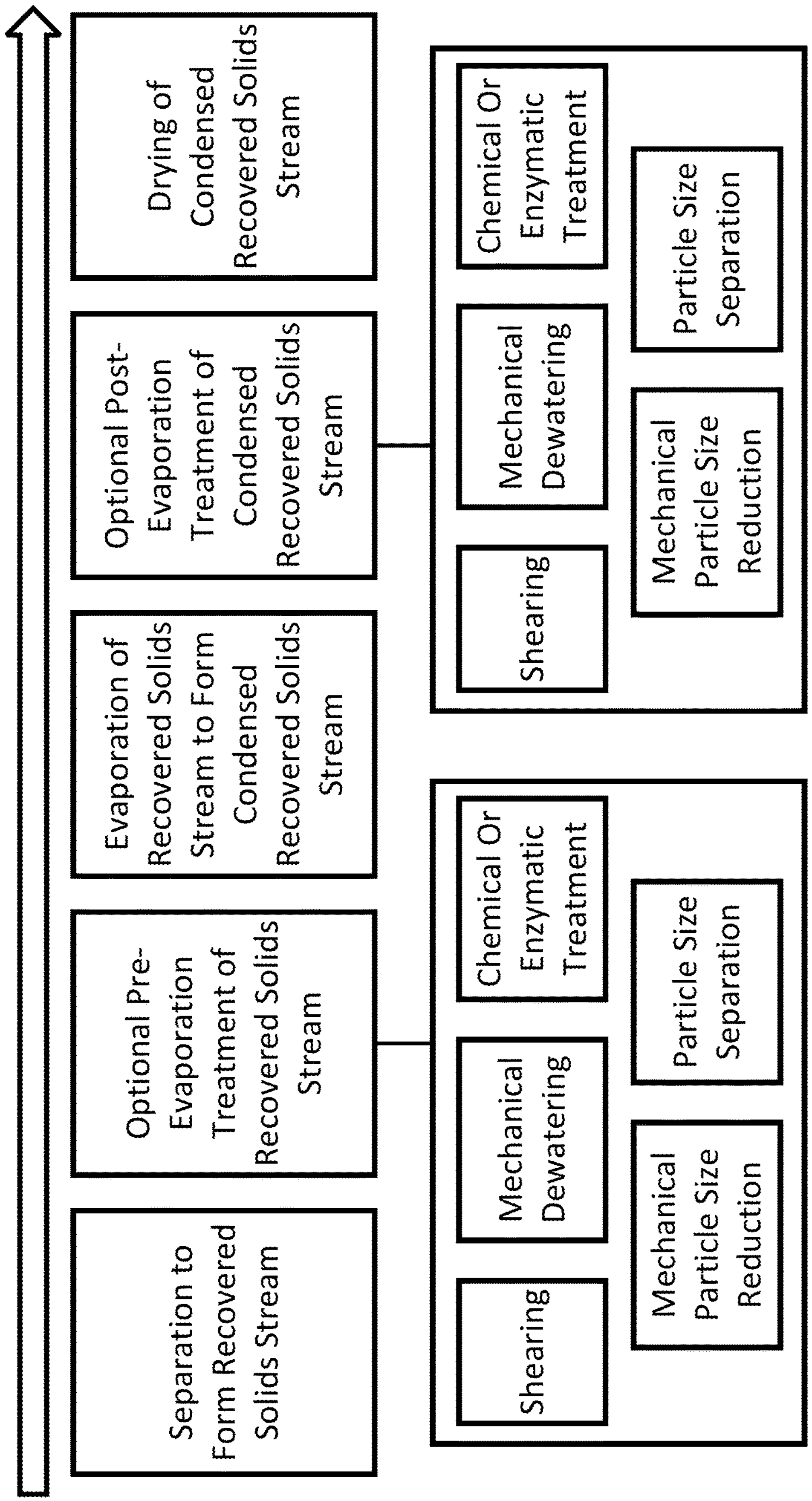

Optionally, as mentioned above, a recovered solids stream can be exposed to one or more additional processes or treatments before or while being exposed to an evaporator system, but before being dried in a dryer system. Also as mentioned above, a concentrated, recovered solids stream can optionally be exposed to one or more additional processes or treatments after being exposed to an evaporator system, but before being dried in a dryer system. For example, the recovered solids stream and/or the concentrated, recovered solids stream may be processed physically, chemically, or enzymatically to provide one or more of moisture removal, viscosity reduction (e.g., to help fluid transport), and the like. Such optional treatments can facilitate processing relatively high solids content streams through process systems such as evaporator systems and/or dryer systems. Non-limiting examples of such processes/treatments are shown in FIG. 7.

In some embodiments, a recovered solids stream and/or the concentrated, recovered solids stream can be exposed to one or more mechanical shearing processes. Because a recovered solids stream and/or the concentrated, recovered solids stream may relatively more concentrated in solids than the process stream it was formed from it can be suitable to mechanical shearing processes as is. If needed, water can be added or removed prior to mechanical shearing processes to make it more suitable to mechanical shearing. In some embodiments, mechanical shearing can reduce the viscosity of the recovered solids stream and/or concentrated, recovered solids stream, thereby making the recovered solids stream and/or the concentrated, recovered solids stream easier to pump, especially through an evaporator system and/or a dryer system, respectively. For example, it is believed that yeast paste exhibits shear-thinning behavior when exposed to mechanical shearing. While not being bound by theory, it is believed that mechanical shearing may also liberate water trapped in suspended solids (e.g., in individual yeast cells) and/or agglomerated suspended solids, thereby making the free water easier to drive off and less energy intensive in the evaporator system and/or a dryer system. Non-limiting examples of mechanical shearing devices include shear mixers (e.g., shear rotor stator mixers), shear pumps, homogenizers, disk refiners, and the like. A single mechanical shearing device can be used, or two or more mechanical shearing devices can be used in parallel and/or series configurations. Further, a single type of mechanical shearing device can be used or in any combination with different types of mechanical shearing devices. A mechanical shearing device can be selected and operated to achieve one or more of desired results as just described herein.

In some embodiments, a recovered solids stream and/or the concentrated, recovered solids stream can be exposed to one or more mechanical particle size reduction processes. Because a recovered solids stream and/or a concentrated, recovered solids stream may relatively more concentrated than the process stream it was formed from it can be suitable to mechanical particle size reduction processes as is. If needed, water can be added or removed prior to mechanical particle size reduction processes to make it more suitable to mechanical particle size reduction. In some embodiments, mechanical particle size reduction device can reduce the viscosity of the recovered solids stream and/or the concentrated, recovered solids stream, thereby making the recovered solids stream and/or the concentrated, recovered solids stream easier to pump, especially through an evaporator system and/or a dryer system, respectively. While not being bound by theory, it is believed that mechanical particle size reduction may also liberate water trapped in suspended solids (e.g., in individual yeast cells) and/or agglomerated suspended solids, thereby making the free water easier to drive off and less energy intensive in the evaporator system and/or dryer system. Non-limiting examples of mechanical particle size reduction devices include mechanical milling such as with one or more disc mills, roller mills, a colloid mills, rotary impact mills (beater mills), jet mills, tumbling mills (e.g., ball mills, tube mills, pebble mills, rod mills, and the like), impact mills, cone mills, centrifugal mills, screw presses, French presses, and combinations thereof. A single mechanical particle size reduction device can be used, or two or more mechanical particle size reduction devices can be used in series and/or parallel configurations. Further, a single type of mechanical particle size reduction device can be used or any combination of different types can be used. A mechanical particle size reduction device can be selected and operated to achieve one or more of desired results as just described herein.

In some embodiments, a recovered solids stream and/or a concentrated, recovered solids stream can be exposed to one or more enzyme treatments to digest cell walls of plant material (e.g., corn grain) and/or microorganisms such as ethanologens (bacteria or yeast). In some embodiments, enzymes may break down solids which can reduce the viscosity of the recovered solids stream and/or the concentrated, recovered solids stream, thereby making the recovered solids stream and/or the concentrated, recovered solids stream easier to pump, especially through an evaporator system and/or a dryer system, respectively. While not being bound by theory, it is believed that enzyme treatment may break down solids and liberate water trapped in suspended solids (e.g., in individual yeast cells) and/or agglomerated suspended solids, thereby making the free water easier to drive off and less energy intensive in the evaporator system and/or the dryer system. Cell walls differ in their composition between types of cells, so an enzyme can be selected to have the correct specificity and activity for a given cell wall substrate. Other considerations in selecting an enzyme include the need for other reagents and/or additional procedures related to the use of that particular enzyme. Enzymes for yeast cellular lysis can include one or more enzymes such as protease, (β-1,3 glucanase (lytic and nonlytic), (β-1,6 glucanase, mannanase, and chitinase. Non-limiting examples of enzyme systems for yeast cellular lysis include zymolyase (also referred to as lyticase), which is an enzyme mixture used to degrade the cell wall of yeast and form spheroplasts. Activities of zymolyase include β-1,3-glucan laminaripentao-hydrolase activity and β-1,3-glucanase activity. Non-limiting examples of enzymes for bacteria cell wall lysis include lysozyme, lysostaphin, achromopeptidase, labiase, and mutanolysin. Non-limiting examples of enzymes for plant cell wall lysis include pectinases and cellulases.

In some embodiments, moisture may be mechanically removed from the recovered solids stream before exposing the recovered solids stream to an evaporator system, e.g., to reduce the energy input into the evaporator system and/or mechanically removed from the concentrated, recovered solids stream before exposing the concentrated, recovered solids stream to a dryer system, e.g., to reduce the energy input into the dryer system. Mechanical dewatering can include centrifugal separation, sedimentation, filtration, and/or sieving. Non-limiting examples of mechanical dewatering include decanters, disk stack centrifuges, screens (e.g., a "DSM" screen, which refers to a Dutch State Mines screen or sieve bend screen, and is a curved concave wedge bar type of stationary screen), filters, hydrocyclones, presses, combinations of these and the like.

Also, it may be desirable to add moisture to the recovered solids stream prior to and/or during mechanically removing moisture and before exposing the recovered solids stream to an evaporator system and/or before exposing the concentrated, recovered solids stream to a dryer system, e.g., by adding fresh water and/or one or more aqueous process streams from a biorefinery. Adding moisture to the recovered solids stream can reduce the concentration of dissolved solids with added moisture through mixing and entropy, and facilitates removal of a larger proportion of dissolved solids in the step of mechanically removing moisture (referred to as "dilution washing"). Adding moisture to the recovered solids stream can be performed in a manner that physically replaces a portion of moisture containing dissolved solids with a portion of added moisture containing less or no dissolved solids, and minimizes localized mixing (referred to as "displacement washing"). Adding moisture may enhance the efficiency of separation of suspended solids in some methods of mechanical moisture removal (e.g. centrifugation and/or filtration). Also, adding moisture to condition the recovered solids stream and/or concentrated, recovered solids stream may facilitate mechanical shearing and mechanical particle size reduction as discussed above. Finally, moisture may be added to the recovered solids stream to facilitate heat transfer in the evaporator system while maintaining the relatively high level of suspended solids on an as-is basis as discussed above.

It may be desirable to separate at least a portion of the suspended solids from the recovered solids stream and/or at least a portion of the suspended solids from the concentrated, recovered solids stream based on particle size, e.g., to decrease a range of particle size distribution of suspended solids. Non-limiting examples of particle size separation include screens, filters, membranes, combinations of these and the like.

Although not shown in FIG. 7, it is believed that certain sonic methods, rotary pulsation, and pulse wave technology may improve the flow of the recovered solids stream prior to and/or during evaporation, and/or improve the flow of the concentrated, recovered solids stream after evaporation in an evaporator system. Sonic methods create low pressure and induce cavitation of solid particles or agglomerates thereof. The cavitated or disrupted particle may improve the flow of the recovered solids stream through an evaporator system and/or the flow of the concentrated, recovered solids through, e.g., a dryer system. A sonic method can include sonicating the recovered solids stream and/or the concentrated, recovered solids stream at a frequency (e.g., measured in kHz), power (e.g., measured in watts), and for a time effective to reduce (or to assist in reducing) the particle size of the suspended particles, or agglomerates thereof. For example, a sonic method can include sonicating the recovered solids stream and/or the concentrated, recovered solids stream at 20,000 Hz and up to about 3000 W for a sufficient time and at a suitable temperature. Such sonicating can be carried out with a commercially available apparatus, such as high powered ultrasonics available from ETREMA (Ames, Iowa).

Rotary pulsation may include rotary pulsating the solid component of a process stream at a frequency (e.g., measured in Hz), power (e.g., measured in watts), and for a time effective to reduce (or to assist in reducing) the particle size of the solid component. Such rotary pulsating can be carried out with known apparatus, such as apparatus described in U.S. Pat. No. 6,648,500, the disclosure of which is incorporated herein by reference.

Additional methods of processing the recovered solids stream and/or the concentrated, recovered solids stream such as disrupting the solids to improve flow are also described in U.S. Pat. No. 8,748,141 (Lewis et al.), wherein the entirety of said patent is incorporated herein by reference.

Drying in a Dryer System

In some embodiments, a concentrated, recovered solids stream can be dried in a dryer system to form a dried product. A concentrated, recovered solids stream can be transferred directly or indirectly to a dryer system to be dried by removing enough moisture to form a dried product. A dried product tends to be a solid particulate in nature such as a powder, a granule, a flake, and the like. As described above, the concentrated, recovered solids stream can optionally be exposed to one or more processes such as one or more of those described in FIG. 7 above before being exposed to a dryer system as described herein. Referring to FIGS. 1 and 2A-2B for illustration purposes, the condensed yeast paste stream can be transferred directly to the dryer system if desired.

Non-limiting examples of dryer systems that can be used to dry a concentrated, recovered solids stream into a dried product include hot gas dryer systems such as a flash dryer system, a ring dryer system, a p-type ring dryer system, a rotary dryer system, a spray dryer system, a dispersion dryer system, a fluidized bed dryer system, combinations thereof and the like. Typically, such dryers involve directly contacting the concentrated, recovered solids stream with a hot gas such as hot air, combustion air, or a blend thereof.

Two or more dryers may be used in a dryer system in series and/or parallel configurations and may be of the same type or different type.

For illustration purposes, a ring dryer system is a type of a pneumatic conveyed flash dryer system that can receive a suspended solids stream such as a concentrated, recovered solids stream as described herein, which can be mixed with a portion of dry product that is recycled from the dryer discharge to form a friable, non-sticky feed material that can be fed into the dryer. A disperser injects the feed material into a hot drying gas stream at a venturi valve of the dryer. At this point, moisture in the feed material is flashed off due to the high velocity of the drying gas stream, which can generate high heat and mass transfer. The drying gas conveys the material to a manifold, or internal classifier. A manifold a single (p-type ring dryer system) or multiple classifiers (e.g., blades). The wetter, heavier particles are separated in the manifold and recycled back to the feed point to dry further, while the drier lighter particles (dry product) are transported downstream and separated from the drying gas in one or more cyclone separators. The presence of a manifold is essentially what distinguishes a ring dryer system from a flash dryer system. A portion of the dry product from the one or more cyclones is recycled to the dryer mixing system to condition the incoming suspended solids stream such as a concentrated, recovered solids stream. The rest of the dry product can pass to a product cooling system. Material such as a concentrated, recovered solids stream that is to be dried in a ring dryer system has relatively short residence time period.

As another illustration, a rotary dryer system will be further described. At least some of the peripheral equipment of a rotary dryer system is similar to a ring dryer system. For example, both systems have a heater to heat drying gas and one or more cyclones to separate the dried product from the drying gas stream. A rotary dryer system includes at least one drying drum that has an internal space where drying gas and wet feed material such as a concentrated, recovered solids stream are brought into contact. The wet feed material is showered through the drying gas by rotating the drum. As the drum rotates, lifters mounted on the inside of the dryer drum wall transport wet feed materials up to the top, where it falls off the lifter and through the drying gas. The residence time through a rotary dryer system can be relatively longer as compared to a ring dryer. Therefore, material (e.g., protein) can be exposed to a drying temperature for a longer time in the rotary dryer as compared to a ring dryer. If desired, at least a portion of dried product can be recycled to condition the wet feed material in a rotary dryer system.

A dryer system can be operated at one or more operating temperatures and pressures, which can be selected depending on one or more factors such as heat sensitivity of one or more components (e.g., protein) of the dried product, type of dryer system and dryer system configuration. In some embodiments, relatively high inlet gas temperatures can be used without damaging sensitive material such as protein because the surface moisture on the wet feed rapidly evaporates at the dryer inlet. This rapid evaporation lowers the gas temperature as it travels from the dryer inlet to the dryer outlet, thereby avoiding undue heat damage to the sensitive material. In some embodiments, a dryer inlet gas temperature can be 400° F. or greater, 500° F. or greater, 600° F. or greater, 700° F. or greater, 750° F. or greater, 800° F. or greater, 850° F. or greater, 900° F. or greater, 950° F. or greater, or even 1,000° F. or greater. In some embodiments, a dryer inlet gas temperature can be from 400° F. to 700° F., or even from 420° F. to 650° F. In some embodiments, a dryer outlet gas temperature can be 250° F. or less, or even 220° F. or less. In some embodiments, a dryer outlet gas temperature can be from 150° F. to 250° F., or even from 180° F. to 210° F. The drying gas in a dryer system can be at a variety of pressures while it contacts a material to be dried. In some embodiments, the drying gas can be at pressure from atmospheric pressure (e.g., 14.7 psia) to less than atmospheric pressure (under vacuum conditions). In some embodiments, a dryer system can include a drying gas at a pressure greater than atmospheric pressure. In some embodiments, exposing a recovered solids stream to an evaporator system according to the present disclosure can permit adjustment of one or more of a downstream dryer parameters as compared to if the evaporator system was not used. For example, a dryer inlet temperature may be reduced. In some embodiments, using an evaporator system according to the present disclosure may allow the inlet temperature of a dryer to be reduced from 900° F. to 600° F. As another example, the flow rate of a concentrated, recovered solids stream through a dryer may be increased. In some embodiments, using an evaporator system according to the present disclosure may allow the production capacity of a dryer system to be increased by permitting the flow rate to a dryer to increase by 50% or more. Additionally, in some embodiments, the average residence time a suspended solid particle spends in a dryer system may be reduced by 50% or greater, or even 33% or greater.

A dryer system can be selected and operated to provide a desired moisture content in a dried product. In some embodiments, a dried product has a suspended solids content of at least 65% on an as-is basis, or even at least 70% on an as-is basis. Also, a dried product according to present disclosure can have relatively less moisture (water) as compared to the stream that was dried to form the dried product. In some embodiments, a dried product has a moisture content of 10% or less on an as-is basis, 8% or less on an as-is basis, 6% or less on an as-is basis, or even 5% or less on an as-is basis. In some embodiments, a dried product has a moisture content from 0.5 to 10% on an as-is basis, from 1 to 8% on an as-is basis, from 2 to 6% on an as-is basis, or even from 3 to 5% on an as-is basis. In some embodiments, a dried product can have a total solids (dissolved and suspended solids) from 90 to 99.5% on an as-is basis, or even from 90 to 95% on an as-is basis.

In some embodiments, the dried product is GDDY, which can be sold as a high protein animal feed. In some embodiments, a GDDY can have greater than 40%, or even greater than 45% protein on a dry wt. basis. In some embodiments, a GDDY can have from 40 to 75%, from 40 to 52%, from 40 to 48%, from 46 to 52%, or even from 48 to 60% protein on a dry wt. basis. The GDDY may be particularly suited for mono-gastric (non-ruminant) and young animal feed. The high protein DDG may have high metabolizable energy and a lysine content of between about 2% and about 5%, which can be important in feed ration formulations.

Referring again to FIG. 2, in some embodiments, although not shown, at least a portion of the yeast paste stream 235 and/or at least a portion of the concentrated yeast paste stream 243 may be combined with the wet cake 219 in order to alter the nutritional makeup of the WDG, DDG, and/or DDGS. Also, combining concentrated yeast paste according to the present disclosure with wet cake can help reduce the dryer load when forming DDG and/or DDGS.

Following are exemplary embodiments of the present disclosure:

1) A method of evaporating moisture from one or more process streams derived from a beer in a biorefinery, wherein the method comprises:

a) recovering at least one recovered solids stream from the one or more process streams derived from a beer, wherein the at least one recovered solids stream has a moisture content of 90% or less on an as-is basis and a suspended solids content of at least 8% on an as-is basis;

b) exposing at least a portion of the at least one recovered solids stream to an evaporator system to remove moisture from the at least a portion of at least one recovered solids stream and form a concentrated, recovered solids stream having a higher suspended solids content on an as-is basis than the at least one recovered solids stream; and c) drying at least a portion of the concentrated, recovered solids stream in a dryer system to form a dried product.

2) The method of embodiment 1, wherein the recovering comprises separating the one or more process streams derived from a beer in one or more separation systems chosen from a centrifuge, a decanter, a filter, and combinations thereof.

3) The method of embodiment 2, wherein the centrifuge is chosen from a two-phase vertical disk stack centrifuge, a three-phase vertical disk stack centrifuges, and combinations thereof.

4) The method of embodiment 2, wherein the decanter comprises a filtration decanter.

5) The method of any preceding embodiment, wherein the concentrated, recovered solids stream has a moisture content of 85% or less on an as-is basis and a suspended solids content of at least 12% on an as-is basis.

6) The method of any preceding embodiment, wherein the dried product has a moisture content of 10% or less on an as-is basis and a suspended solids content of at least 65% on an as-is basis.

7) The method of embodiment 6, wherein the dried product is grain distiller's dried yeast comprising a moisture content of less than 10% on an as-is basis, and a protein content of at least 40% on a dry weight basis, wherein the protein content comprises corn protein and yeast protein.

8) The method of any preceding embodiment, wherein the evaporator system is chosen from a falling film evaporator system, a suppressed boiling evaporator system, a wiped film evaporator system and combinations thereof.

9) The method of any preceding embodiment, wherein the dryer system is chosen from a flash dryer system, a ring dryer system, a p-type ring dryer system, a rotary dryer system, a spray dryer system, a dispersion dryer system, and combinations thereof.

10) The method of any preceding embodiment, further comprising exposing the at least a portion of the at least one recovered solids stream to one or more additional processes prior to and/or during exposing the at least a portion of the at least one recovered solids stream to an evaporator system, wherein the additional processes are chosen from one or more mechanical shearing processes; one or more mechanical particle size reduction processes; one or more enzyme treatments; one or more chemical treatments; one or more particle size separation processes; and combinations thereof.

11) The method of any preceding embodiment, further comprising exposing the at least a portion of the concentrated, recovered solids stream to one or more additional processes prior to and/or during drying the at least a portion of the concentrated, recovered solids stream, wherein the additional processes are chosen from one or more mechanical shearing processes; one or more mechanical particle size reduction processes; one or more enzyme treatments; one or more chemical treatments; one or more particle size separation processes; and combinations thereof.

12) The method of any preceding embodiment, further comprising, prior to exposing the at least one recovered solids stream to an evaporator system, adding an aqueous liquid to the at least a portion of the at least one recovered solids stream.

13) The method of embodiment 12, wherein, after adding the aqueous liquid to the at least a portion of the at least one recovered solids stream, mechanically dewatering the recovered solids stream prior to exposing the at least one recovered solids stream to an evaporator system.

14) The method of any preceding embodiment, wherein the at least one recovered solids stream is transferred directly or indirectly to the evaporator system from the recovering step.

15) The method of any preceding embodiment, further comprising:

providing a grain feedstock;

saccharifying the grain feedstock to provide at least one monosaccharide sugar;

fermenting the at least one monosaccharide sugar via a microorganism to form the beer, wherein the beer comprises one or more biochemicals;

distilling the one or more biochemicals from at least a portion of the beer to form whole stillage; and separating the whole stillage into a thin stillage stream and a wet cake stream, wherein the one or more process streams derived from a beer comprise at least a portion of the thin stillage stream.

16) The method of any preceding embodiment 5, wherein the grain is a whole corn, wherein providing a grain feedstock comprises dry grinding whole corn, wherein the microorganism comprise yeast, and wherein the at least one monosaccharide sugar comprises glucose.

17) The method of any preceding embodiment, further comprising:

providing a grain feedstock;

saccharifying the grain feedstock to provide at least one monosaccharide sugar;

fermenting the at least one monosaccharide sugar via a microorganism to form the beer, wherein the beer comprises one or more biochemicals;

distilling the one or more biochemicals from at least a portion of the beer to form whole stillage;

separating the whole stillage into a thin stillage stream and a wet cake stream, evaporating a portion of water from the at least a portion of the thin stillage stream to condense the at least a portion of the thin stillage stream into a syrup stream;

separating the syrup stream into a first oil fraction stream and a first aqueous fraction stream, wherein the first oil fraction stream is an emulsion stream; and breaking the emulsion stream to separate the first oil fraction stream into a second oil fraction stream and a second aqueous fraction stream, wherein the one or more process streams derived from a beer comprise at least a portion of the first aqueous fraction stream and/or at least a portion of the second aqueous fraction stream.

18) The method of any preceding embodiment, further comprising:

providing a grain feedstock;

saccharifying the grain feedstock to provide at least one monosaccharide sugar;

fermenting the at least one monosaccharide sugar via a microorganism to form the beer, wherein the beer comprises one or more biochemicals;

separating at least a portion of the beer into a first stream and second stream, wherein the first stream comprises water, at least a portion of the one or more biochemicals, grain protein, and microorganism protein, and wherein the second stream comprises grain fiber; and separating the first stream into a third stream and a fourth stream, wherein the third stream is the recovered solids stream, and wherein the third stream comprises grain protein and microorganism protein.

19) The method of any preceding embodiment, wherein the recovered solids stream comprises corn protein and yeast protein.

20) A biorefinery system configured to evaporate moisture from one or more process streams derived from a beer, wherein the system comprises:

a) at least one separation system in fluid communication with the one or more process streams derived from the beer, wherein the separation system is configured to recover at least one recovered solids stream from the one or more process streams derived from the beer, wherein the at least one recovered solids stream has a moisture content of 90% or less on an as-is basis and a suspended solids content of at least 8% on an as-is basis;

b) at least one evaporation system in direct or indirect fluid communication with the recovered solids stream, wherein the evaporation system is configured to directly or indirectly receive and expose the at least one recovered solids stream to at least one evaporation process to remove moisture from the at least one recovered solids stream and form a concentrated, recovered solids stream having a higher suspended solids content on an as-is basis than the at least one recovered solids stream; and c) at least one dryer system configured to receive and dry the concentrated, recovered solids stream to form a dried product.

What is claimed is:

1. A method of evaporating moisture from one or more process streams derived from a beer in a biorefinery, wherein the method comprises:

a) recovering at least one recovered solids stream from the one or more process streams derived from a beer;

b) exposing at least a portion of the at least one recovered solids stream to one or more mechanical particle size reduction devices; and c) after exposing at least a portion of the at least one recovered solids stream to one or more mechanical particle size reduction processes, exposing the at least a portion of the at least one recovered solids stream to an evaporator system to remove moisture from the at least a portion of at least one recovered solids stream and form a concentrated, recovered solids stream having a higher suspended solids content on an as-is basis than the at least one recovered solids stream.

2. The method of claim 1, wherein the recovering comprises separating the one or more process streams derived from a beer in one or more separation systems chosen from a centrifuge, a decanter, a filter, and combinations thereof.

3. The method of claim 2, wherein the decanter comprises a filtration decanter.

4. The method of claim 1, wherein recovering at least one recovered solids stream from the one or more process streams derived from a beer comprises separating whole stillage into the at least one recovered solids stream and thin stillage.

5. The method of claim 4, wherein the one or more mechanical particle size reduction devices are chosen from one or more disc mills, one or more roller mills, one or more colloid mills, one or more rotary impact mills, one or more jet mills, one or more tumbling mills, one or more impact mills, one or more cone mills, one or more centrifugal mills, one or more screw presses, one or more French presses, and combinations thereof.

6. The method of claim 5, wherein exposing at least a portion of the at least one recovered solids stream to one or more mechanical particle size reduction devices comprises exposing at least a portion of the at least one recovered solids stream to one or more screw presses to form a pressate and a presscake, and wherein exposing the at least a portion of the at least one recovered solids stream to the evaporator system comprises exposing at least a portion of the pressate to the evaporator system.

7. The method of claim 6, further comprising, prior to exposing the at least a portion of the at least one recovered solids stream to an evaporator system:

adding one or more aqueous process streams to the at least a portion of the at least one recovered solids stream to form a diluted, recovered solids stream; and mechanically dewatering the diluted, recovered solids stream prior to exposing the at least one recovered solids stream to an evaporator system.

8. The method of claim 1, wherein the evaporator system is chosen from a falling film evaporator system, a suppressed boiling evaporator system, a wiped film evaporator system and combinations thereof.

9. The method of claim 1, wherein the at least one recovered solids stream is transferred directly or indirectly to the evaporator system from the recovering step.

10. The method of claim 1, further comprising:

providing a grain feedstock;

saccharifying the grain feedstock to provide at least one monosaccharide sugar;

fermenting the at least one monosaccharide sugar via a microorganism to form the beer, wherein the beer comprises one or more biochemicals; and separating the one or more biochemicals from at least a portion of the beer to form one or more process streams derived from a beer.

11. The method of claim 10, wherein the separating the one or more biochemicals from at least a portion of the beer comprises distilling the one or more biochemicals from at least a portion of the beer to form to form the one or more process streams derived from a beer.

12. The method of claim 11, wherein distilling the one or more biochemicals from at least a portion of the beer to form whole stillage and further comprising separating the whole stillage into thin stillage and wet cake, wherein recovering at least one recovered solids stream from the one or more process streams derived from a beer comprises recovering at least one recovered solids stream from at least a portion of the thin stillage and/or at least a portion of the wet cake.

13. The method of claim 10, wherein the grain feedstock comprises a whole corn, wherein providing the grain feedstock comprises dry grinding the whole corn, wherein the microorganism comprise yeast, and wherein the at least one monosaccharide sugar comprises glucose.

14. The method of claim 1, further comprising:

providing a grain feedstock;

saccharifying the grain feedstock to provide at least one monosaccharide sugar;

fermenting the at least one monosaccharide sugar via a microorganism to form the beer, wherein the beer comprises one or more biochemicals;

separating the one or more biochemicals from at least a portion of the beer to form whole stillage;

separating the whole stillage into thin stillage and wet cake, evaporating a portion of water from at least a portion of the thin stillage to condense the at least a portion of the thin stillage stream into syrup;

separating the syrup stream into a first oil fraction stream and a first aqueous fraction stream, wherein the first oil fraction stream is an emulsion stream; and breaking the emulsion stream to separate the first oil fraction stream into a second oil fraction stream and a second aqueous fraction stream, wherein the one or more process streams derived from a beer comprise at least a portion of the first aqueous fraction stream and/or at least a portion of the second aqueous fraction stream.

15. The method of claim 1, further comprising:

providing a grain feedstock;

saccharifying the grain feedstock to provide at least one monosaccharide sugar;

fermenting the at least one monosaccharide sugar via a microorganism to form the beer, wherein the beer comprises one or more biochemicals;

separating at least a portion of the beer into a first stream and second stream, wherein the first stream comprises water, at least a portion of the one or more biochemicals, grain protein, and microorganism protein, and wherein the second stream comprises grain fiber; and separating the first stream into a third stream and a fourth stream, wherein the third stream is the recovered solids stream, and wherein the third stream comprises grain protein and microorganism protein.

16. The method of claim 1, wherein the at least one recovered solids stream comprises corn protein and yeast protein.

17. The method of claim 1, wherein the at least one recovered solids stream has a suspended solids content of at least 10% by weight on an as-is basis.

18. The method of claim 1, further comprising drying at least a portion of the concentrated, recovered solids stream in a dryer system to form a dried product.

19. The method of claim 18, wherein the dryer system is chosen from a flash dryer system, a ring dryer system, a p-type ring dryer system, a rotary dryer system, a spray dryer system, a dispersion dryer system, a fluidized bed dryer system, and combinations thereof.

20. A method of evaporating moisture from one or more process streams derived from a beer in a biorefinery, wherein the method comprises:

a) recovering at least one recovered solids stream from the one or more process streams derived from a beer;

b) exposing at least a portion of the at least one recovered solids stream to one or more mechanical shearing devices, sonication, rotary pulsation, and combinations thereof; and c) after exposing at least a portion of the at least one recovered solids stream to one or more mechanical shearing devices, sonication, rotary pulsation, and combinations thereof, exposing the at least a portion of the at least one recovered solids stream to an evaporator system to remove moisture from the at least a portion of at least one recovered solids stream and form a concentrated, recovered solids stream having a higher suspended solids content on an as-is basis than the at least one recovered solids stream.

21. The method of claim 20, wherein exposing at least a portion of the at least one recovered solids stream to one or more mechanical shearing devices, sonication, rotary pulsation, and combinations thereof, comprises exposing at least a portion of the at least one recovered solids stream to one or more mechanical shearing devices.

22. The method of claim 21, further comprising:

providing a grain feedstock;

saccharifying the grain feedstock to provide at least one monosaccharide sugar;

fermenting the at least one monosaccharide sugar via a microorganism to form the beer, wherein the beer comprises one or more biochemicals; and separating the one or more biochemicals from at least a portion of the beer to form one or more process streams derived from a beer.

* * * * *